United States Patent
Hirata et al.

(10) Patent No.: US 8,379,502 B2
(45) Date of Patent: Feb. 19, 2013

(54) RECORDING HEAD, METHOD OF MANUFACTURING RECORDING HEAD, AND INFORMATION RECORDING AND PLAYBACK APPARATUS

(75) Inventors: Masakazu Hirata, Chiba (JP); Norio Chiba, Chiba (JP); Manabu Oumi, Chiba (JP); Yoko Shinohara, Chiba (JP); Sachiko Tanabe, Chiba (JP); Yoshikazu Tanaka, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 13/373,177

(22) Filed: Nov. 7, 2011

(65) Prior Publication Data

US 2012/0113769 A1    May 10, 2012

(30) Foreign Application Priority Data

Nov. 8, 2010    (JP) .................................. 2010-249964

(51) Int. Cl.
*G11B 7/00* (2006.01)
*G11B 5/02* (2006.01)

(52) U.S. Cl. ..................................... 369/112.23; 360/59
(58) Field of Classification Search ............. 369/112.23, 369/112.17, 44.12; 359/726, 707, 727; 360/59
See application file for complete search history.

(56) References Cited

U.S. PATENT DOCUMENTS 6,980,374 B1 * 12/2005 Schlesinger .................. 359/726

FOREIGN PATENT DOCUMENTS

JP    2008217961    9/2008

* cited by examiner

*Primary Examiner* — Nabil Hindi
(74) *Attorney, Agent, or Firm* — Adams & Wilks

(57) ABSTRACT

A near-field light generating element has a core that guides a laser light in a direction of a disk while reflecting the laser light, and a cladding that encapsulates the core in an inner portion, and lengths of a longitudinal direction and a transverse direction of an incident side end surface of the laser light in the core are formed so as to match the lengths of a long axis direction and a short axis direction of the laser light that is entered to the core.

8 Claims, 15 Drawing Sheets

FIG. 15
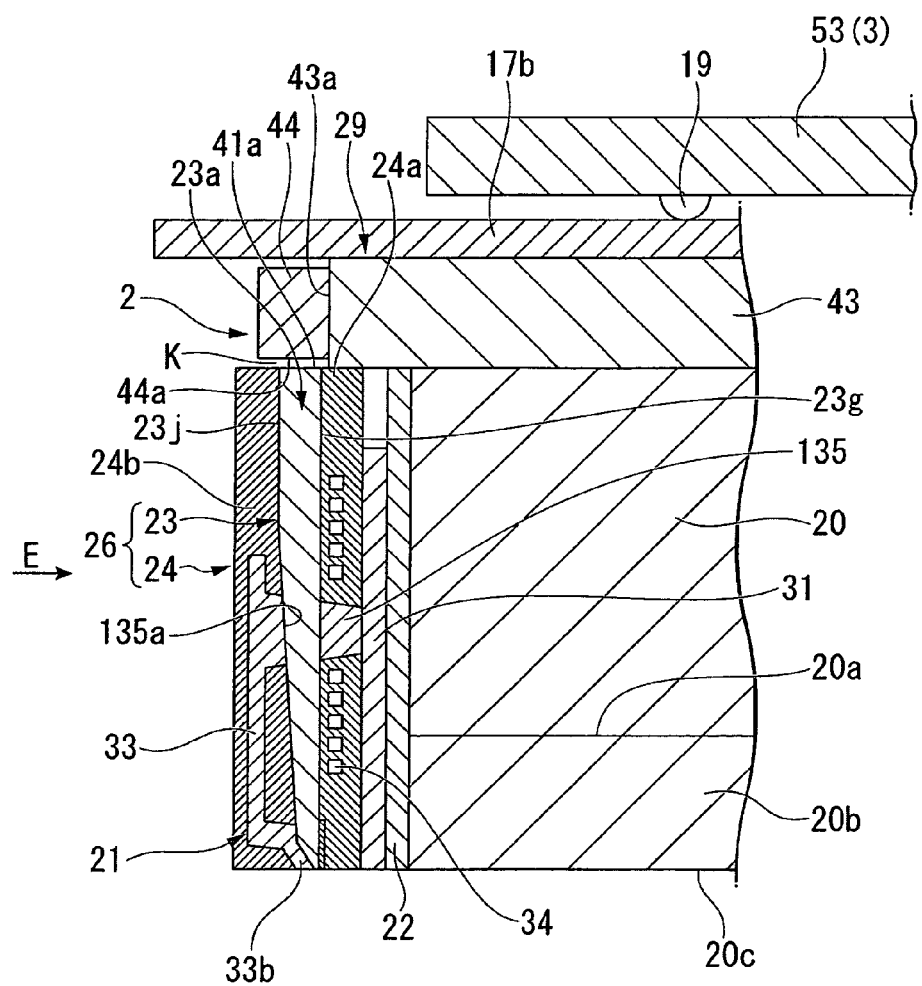
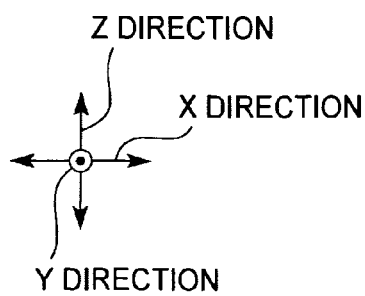

FIG. 17
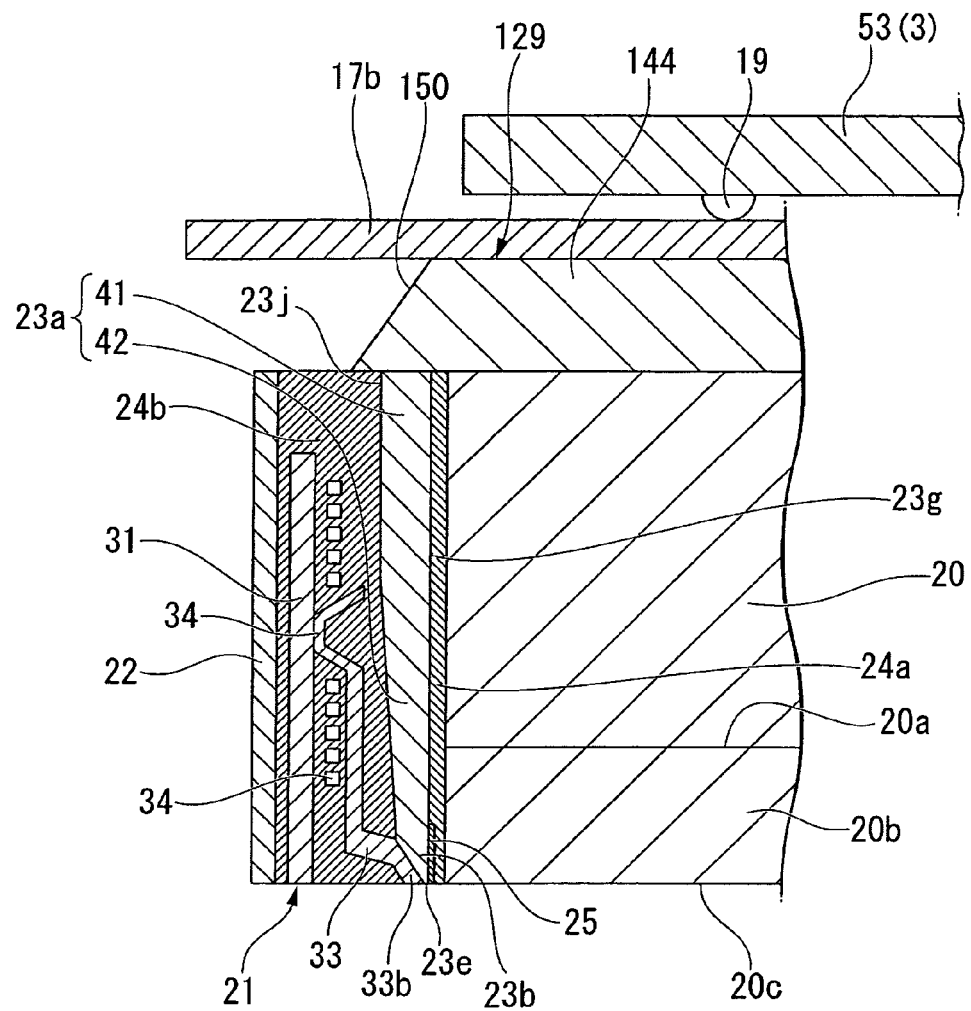
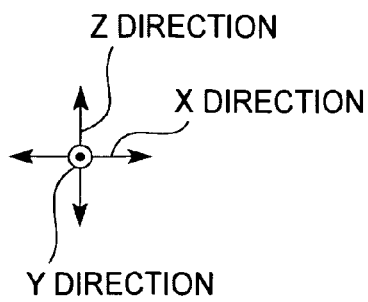

RECORDING HEAD, METHOD OF MANUFACTURING RECORDING HEAD, AND INFORMATION RECORDING AND PLAYBACK APPARATUS

BACKGROUND OF THE INVENTION

1. Field of the Invention

The present invention relates to a recording head which records various pieces of information on a magnetic recording medium using a spot light having focused light or a near-field light, a method of manufacturing the recording head, and an information recording and playback apparatus.

2. Background Art

In recent years, there has been demand for a magnetic recording medium (hereinafter, referred to as a disk) such as a hard disk in computer equipment having further high density in response to the need to perform the recording and the playback of mass and high density information, and the like. For this reason, in order to suppress an effect between adjacent magnetic domains or a thermal fluctuation to the minimum, a medium having a strong coercive force has begun to be adopted as the disk. For this reason, it is difficult to record information on the disk.

Thus, in order to solve the disadvantage mentioned above, an information recording and playback apparatus of a hybrid magnetic recording type is provided which locally heats the magnetic domain using the spot light having the focused light or the near-field light having the focused light, temporarily lowers the coercive force, and performs writing onto the disk in the meanwhile.

Particularly, in the case of using the near-field light, it is possible to handle optical information in a region that is equal to or less than the wavelength of light which was limited in an optical system of the related art. Thus, it is possible to promote a high density of a recording bit that surpasses an optical information recording and playback apparatus or the like of the related art.

As a recording head by a hybrid magnetic recording method, various recording heads are provided, but as one of them, a recording head is known which performs the heating using the near-field light (see JP-A-2008-217961).

The recording head described in JP-A-2008-217961 mainly includes a slider, a recording element having a main magnetic pole and a return pole disposed on the slider, a near-field light generating element that generates the near-field light from the irradiated laser light, and an optical waveguide that guides the laser light emitted from a laser light source up to the near-field light generating element.

The near-field light generating element has a core that transmits the laser light while reflecting the same, a light flux transmission element having a cladding that comes into close-contact with the core and seals the core, and a metal film that is disposed between the core and the cladding and generates the near-field light from the laser light. In the core, a cross-section perpendicular to a longitudinal direction (the transmission direction of laser light) facing from one end side to the other end side is formed in a triangular shape, and the core is formed with an aperture so that the cross-sectional area is gradually reduced along the longitudinal direction.

When using the recording head configured in this manner, by generating the near-field light and applying the recording magnetic field, various pieces of information are recorded on the disk. Specifically, in the near-field light generating element, the laser light irradiated from the laser light source is entered from one end side of the core into an inner portion of the core through the optical waveguide. Moreover, the laser light entered to the core is transmitted while being focused from the one end side to the other end side, the laser light is converted to the near-field light by the metal film at the other end side of the core, and the disk is heated by the near-field light. As a consequence, a magnetic recording layer of the disk is locally heated by the near-field light, and the coercive force is temporarily lowered. Furthermore, by supplying the driving current to the recording element simultaneously with the irradiation of the laser light, the recording magnetic field is locally applied to the magnetic recording layer of the disk adjacent to the main magnetic pole.

As a result, it is possible to record various pieces of information on the magnetic recording layer having a temporarily lowered coercive force. That is, the recording onto the disk can be performed by the cooperation of the thermal assist of the near-field light and the magnetic field.

Recently, in the recording head mentioned above, for example, a configuration is being considered in which the laser light source is directly mounted on a slider, and the laser light emitted from the laser light source is directly entered into the core of the near-field light generating element.

However, problems as below are generated when adopting the configuration mentioned above.

That is, as a laser light source mounted on the slider, for example, it is possible to think that a semiconductor laser chip (hereinafter, referred to as a semiconductor laser) of a thin film or the like is used. In this case, since the spot shape of the laser light emitted from the semiconductor laser is a diffusion light of an elliptical shape, in order to make all the laser lights emitted from the semiconductor laser incident into the core, there is a need to increase the size of the cross-sectional area of the incident side end surface of the core.

Meanwhile, in order to promote a reduction in size of the recording head, it is desirable to reduce the cross-sectional area of the core as much as possible. However, in this case, since not all of the laser lights are entered into the core and the loss of the laser light is increased, there is a problem in that a sufficient amount of light cannot be obtained. As a consequence, the generation efficiency of the near-field light is lowered.

Thus, the present invention was made in consideration of such circumstances, and an object thereof is to provide a recording head that can ensure a sufficient amount of light after promoting a reduction in size, a method of manufacturing the recording head, and an information recording and playback apparatus.

SUMMARY OF THE INVENTION

The present invention provides means, as below, for solving the problems mentioned above.

According to the present invention, there is provided a recording head which includes a slider that is disposed opposite to a surface of a magnetic recording medium rotating in a certain direction; a light flux transmission element that is held in the slider, and transmits the light flux emitted from a light source while focusing the light flux toward the surface of the magnetic recording medium; and a recording element that gives the magnetic recording medium a recording magnetic field, wherein the light flux transmission element has a core that guides the light flux in a direction of the magnetic recording medium while reflecting the light flux, and claddings that encapsulate the core in an inner portion, and lengths of a longitudinal direction and a transverse direction of an incident side end surface of the light flux in the core are formed so as to match the lengths of a long axis direction and a short axis direction of the light flux that is entered to the core.

According to the configuration, for example, even when the spot shape such as a semiconductor laser introduces the light flux of the elliptical shape, the light flux emitted from the light source can be introduced without leakage. Furthermore, unlike a case where the core shape is simply increased in a similar figure from the core shape (for example, a triangular shape or the like) of the related art, it is possible to make the lengths of the longitudinal direction and the transverse direction in the incident side end surface of the core as small as possible.

As a consequence, a sufficient amount of light can be ensured after promoting a reduction in size of the light flux transmission element.

Furthermore, the light source is directly mounted on the slider.

According to the configuration, by directly mounting the light source on the slider, for example, the light flux emitted from the light source can be directly introduced to the light flux transmission element. As a result, for example, as compared to a case where the light source is provided outside the recording head, since there is no need to use an optical waveguide or the like for guiding the light flux up to the light flux transmission element, loss of the light flux in the optical waveguide or the like is not considered. Thus, a more sufficient amount of light can be introduced to the light flux transmission element. Furthermore, it is possible to reduce the cost and the number of manufacturing processes by the provision of the optical waveguide.

Furthermore, the shape of the incident side end surface of the core may be formed in a polygonal shape.

Furthermore, the shape of the incident side end surface of the core is formed in a trapezoidal shape.

Furthermore, the shape of the incident side end surface of the core is formed in the trapezoidal shape, and meanwhile, a shape of an emission side end surface is formed in a triangular shape.

Furthermore, the incident side end surface of the core has a curved portion.

According to the configuration, unlike a case where the shape of the incident side end surface of the core is simply increased, a sufficient amount of light can be ensured after promoting a reduction in size.

Furthermore, according to the present invention, there is provided a method of manufacturing the recording head, the method includes a first cladding forming process of forming a first cladding among the claddings on the slider; a core forming process of forming a base material of the core on the first cladding; a patterning process of patterning the base material of the core; and a second cladding forming process of forming a second cladding among the claddings so as to interpose the core between the second cladding and the first cladding, wherein, in the pattering process, the lengths of the longitudinal direction and the transverse direction of the incident side end surface of the light flux in the core are patterned so as to match the lengths of a long axis direction and a short axis direction of the light flux that is entered to the core.

According to the configuration, by forming the lengths of the longitudinal direction and the transverse direction of the incident side end surface in the core so as to match the lengths of the long axis direction and the short axis direction of the light flux, the light flux emitted from the light source can be introduced without omission. Furthermore, unlike a case where the core shape is simply increased in a similar figure from the core shape (for example, a triangular shape or the like) of the related art, it is possible to make the lengths of the longitudinal direction and the transverse direction in the incident side end surface of the core as small as possible.

As a consequence, a sufficient amount of light can be ensured after promoting a reduction in size of the light flux transmission element.

Furthermore, an information recording and playback apparatus according to the present invention includes the recording head of the present invention; a suspension that can be moved in a direction parallel to the surface of the magnetic recording medium and supports the recording head at a tip side in the state of being freely rotatable around two axes which are parallel to the surface of the magnetic recording medium and perpendicular to each other; an actuator that supports a proximal end side of the suspension and moves the suspension toward a direction parallel to the surface of the magnetic recording medium; a rotation driving portion that rotates the magnetic recording medium in the certain direction; and a control portion that controls the operation of the recording element and the light source.

According to the configuration, since the information recording and playback device includes the recording head of the present invention, it is possible to suppress the effect of the thermal fluctuation phenomenon or the like, thereby performing stable recording. Thus, the reliability of the writing of the recording head itself can be increased, whereby the high quality can be promoted.

According to the recording head according to the present invention and the method of manufacturing the same, a sufficient amount of light can be ensured after promoting a reduction in size of the light flux transmission element.

According to the information recording and playback apparatus according to the present invention, it is possible to suppress the aforementioned effect of the thermal fluctuation phenomenon or the like, thereby performing stable recording. Thus, the reliability of the writing is high, and it is possible to cope with high density recording, whereby high quality can be promoted.

BRIEF DESCRIPTION OF THE DRAWINGS

FIG. 15 is an enlarged cross-sectional view of an outflow end side (a front side) of a recording and playback head in a third embodiment.

FIG. 17 is an enlarged cross-sectional view of an outflow end side (a front side) of a recording and playback head in a fourth embodiment.

DETAILED DESCRIPTION OF THE INVENTION

Next, embodiments of the present invention will be described based on the drawings.

Figure 5:
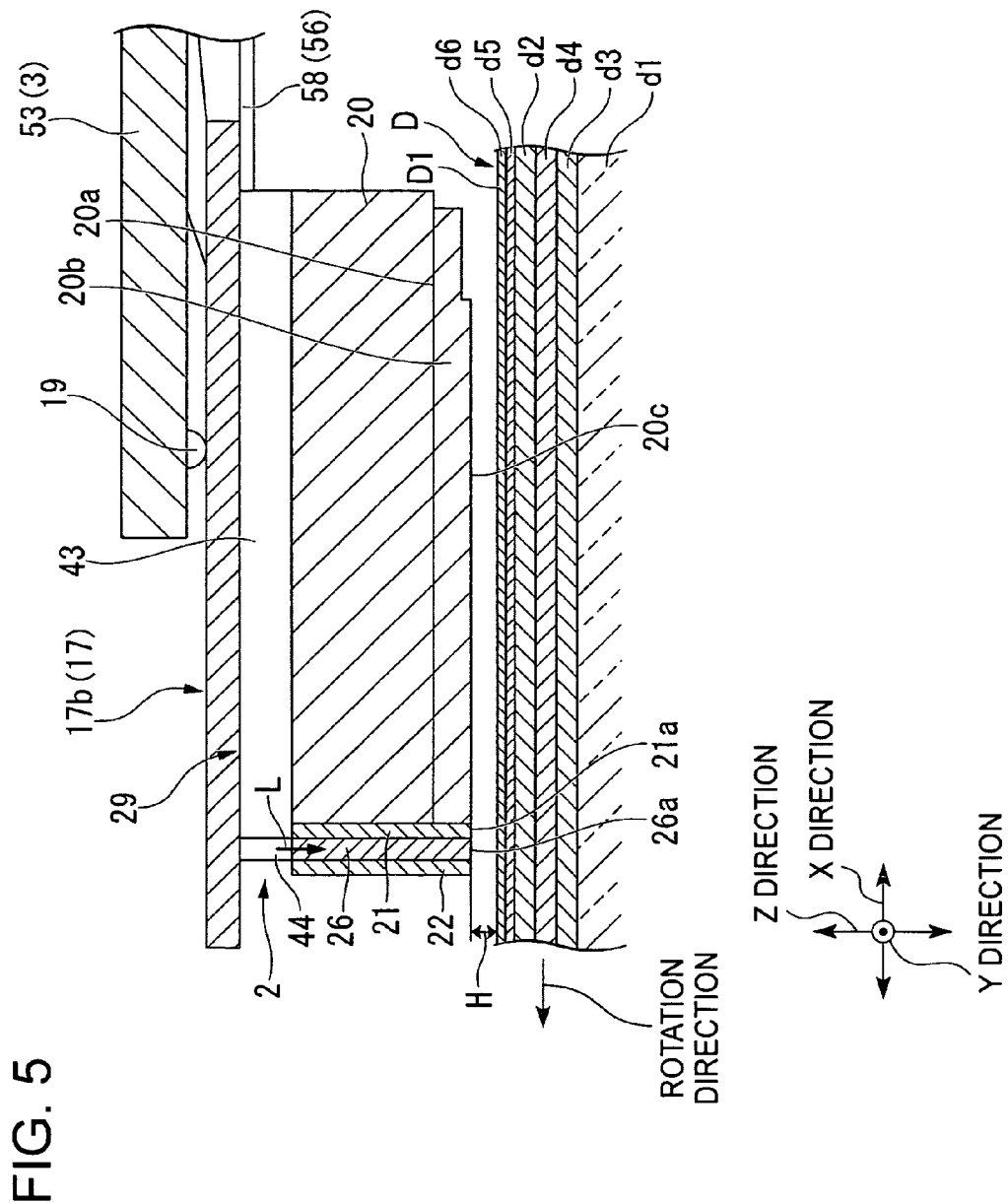
FIG. 5 is an enlarged cross-sectional view of a recording and playback head.

In addition, an information recording and playback apparatus 1 of the present embodiment is an apparatus that performs the recording and playback on a disk D by a hybrid magnetic recording type in which a near-field light R cooperates with the recording magnetic field, with respect to a disk (a magnetic recording medium) D having a perpendicular recording layer d2 (see FIG. 5).

First Embodiment

Information Recording and Playback Apparatus

Figure 1:
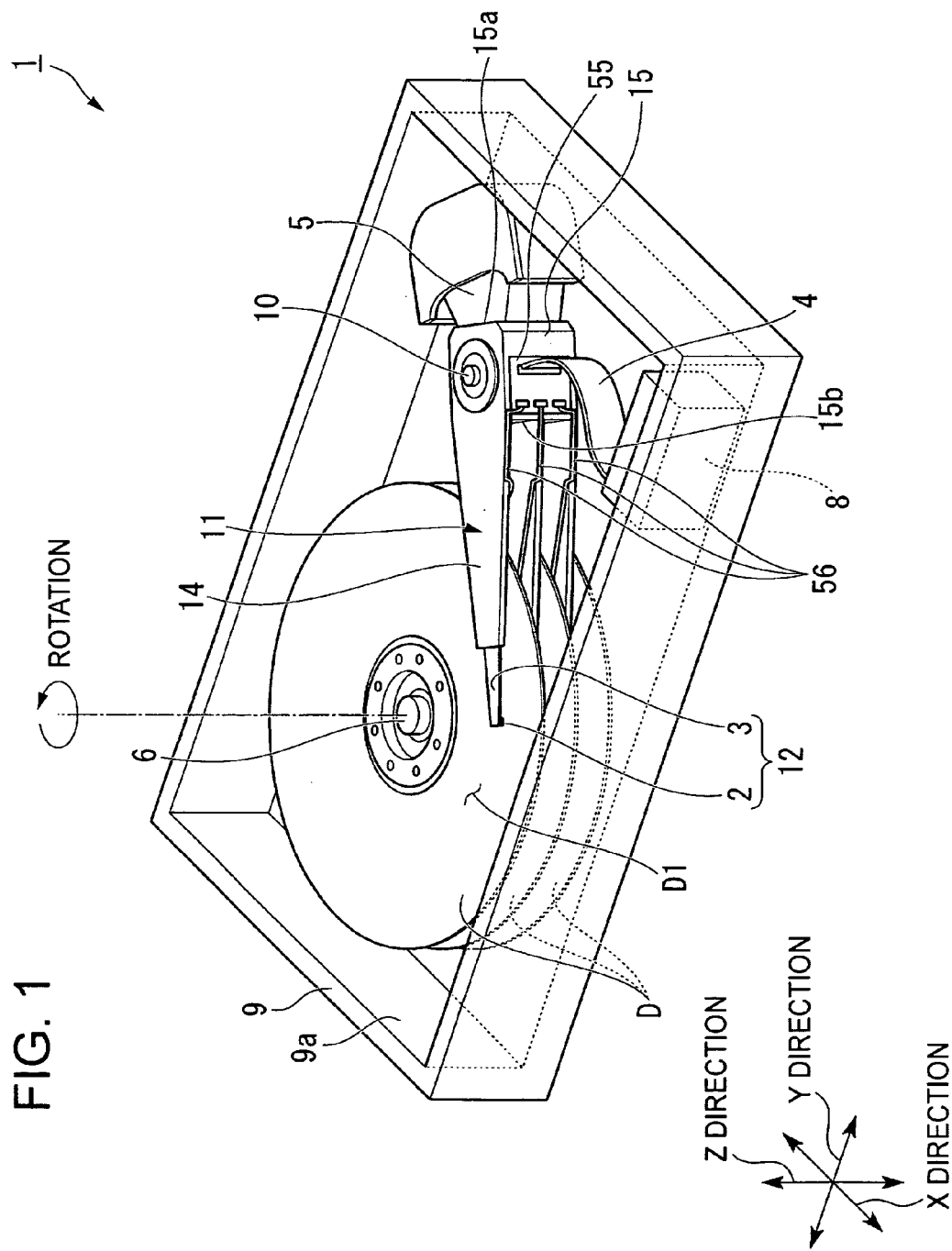
FIG. 1 is a configuration diagram of an information recording and playback apparatus in an embodiment of the present invention.

FIG. 1 is a configuration diagram of an information recording and playback apparatus.

As shown in FIG. 1, the information recording and playback apparatus 1 of the present embodiment includes a carriage 11, a head gimbal assembly (HGA) 12 supported on a tip side of the carriage 11, an actuator 5 that scans and moves the head gimbal assembly 12 toward an XY direction parallel to a disk surface D1 (the surface of the disk D), a spindle motor 6 that rotates the disk D toward a predetermined direction, a control portion 8 that supplies the electric current modulated depending on information to the recording and playback head (the recording head) 2 of the head gimbal assembly 12, and a housing 9 that accommodates the respective components in the inner portion.

The housing 9 is formed in a rectangular shape when viewed from the upper surface by a metallic material such as aluminum, and a concave portion 9a accommodating the respective components are formed inside thereof. Furthermore, a lid (not shown) is fixed to the housing 9 so as to close an opening of the concave portion 9a in a freely attachable and detachable manner. The spindle motor 6 is attached to the approximate center of the concave portion 9a, and the disk D is fixed in a freely attachable and detachable manner by inserting a center hole into the spindle motor 6.

The actuator 5 is attached to the corner portion of the concave portion 9a. The carriage 11 is attached to the actuator 5 via a pivot shaft 10. The carriage 11 is a member in which an arm portion 14 extended from the proximal end portion to the tip portion along the disk surface D1 is formed integrally with a base portion 15 supporting the arm portion 14 via the proximal end portion in a cantilever shape, by cut-out machining or the like.

The base portion 15 is formed in a rectangular shape and is rotatably supported around the pivot shaft 10. That is, the base portion 15 is connected to the actuator 5 via the pivot shaft 10, whereby the pivot shaft 10 is a rotational center of the carriage 11.

The arm portion 14 is a flat plate shape portion that is extended parallel to the plane direction (the XY direction) of the upper surface of the base portion 15 on a side surface (the side surface opposite to the corner portion) 15b opposite to the side surface 15a mounted with the actuator 5 in the base portion 15. Three arm portions 14 are extended along a height direction (the Z direction) of the base portion 15. Specifically, the arm portions 14 are formed in a taper shape tapering facing away from the proximal end portion to the tip portion and are disposed so as to interpose the disk D between the respective arm portions 14. That is, the arm portion 14 and the disk D are disposed so as to be staggered with each other, and the arm portion 14 can be moved in the direction (the XY direction) parallel to the surface of the disk D by the driving of the actuator 5. In addition, the carriage 11 and the head gimbal assembly 12 are retreated from the upside of the disk D by the driving of the actuator 5 when the rotation of the disk D is stopped.

(Head Gimbal Assembly)

The head gimbal assembly 12 supports the recording and playback head 2 that is a near-field light head having a near-field light generating element (a light flux transmission element) 26 described later.

Figure 2:
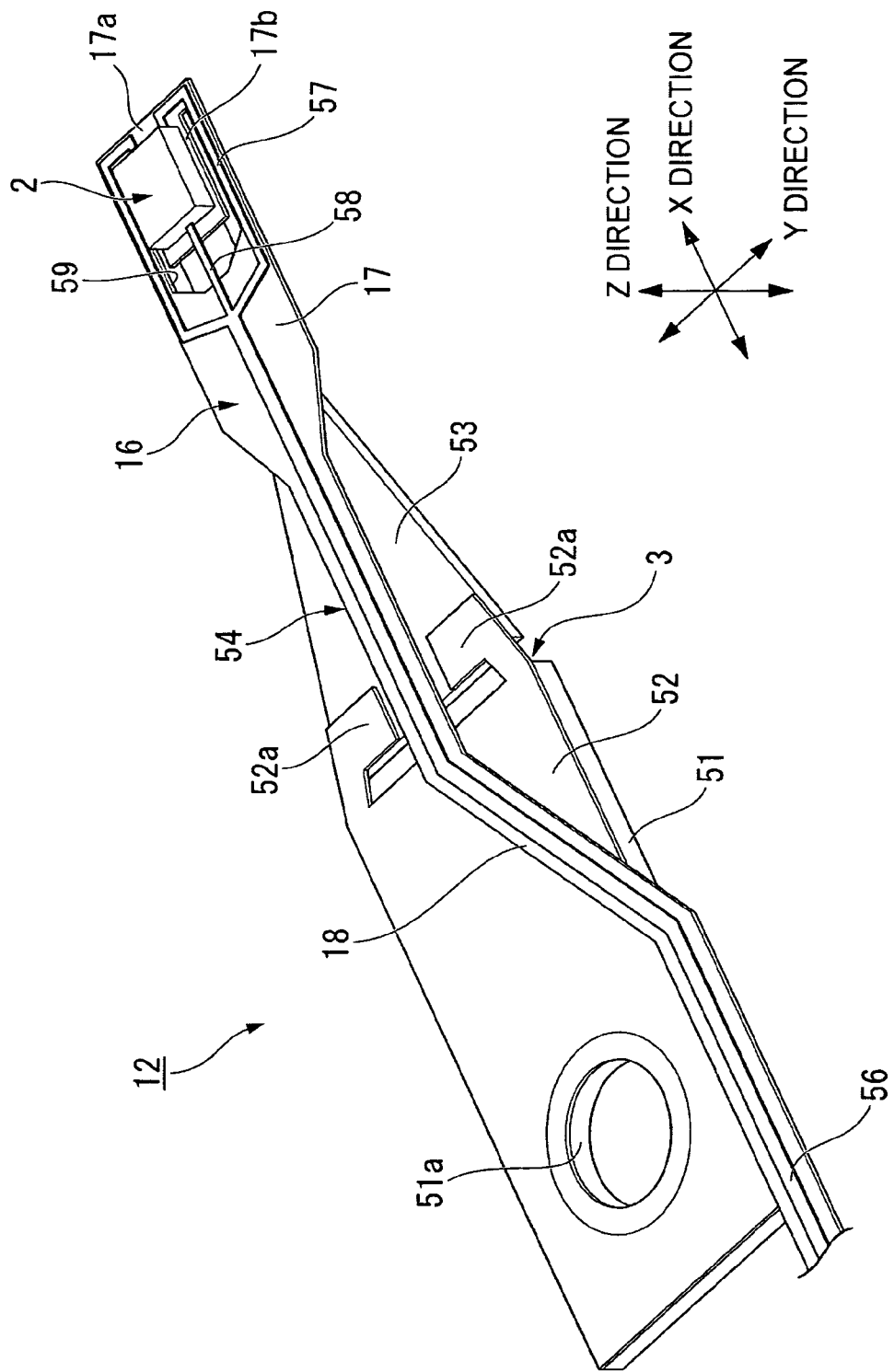
FIG. 2 is a perspective view of a head gimbal assembly shown in FIG. 1.
Figure 3:
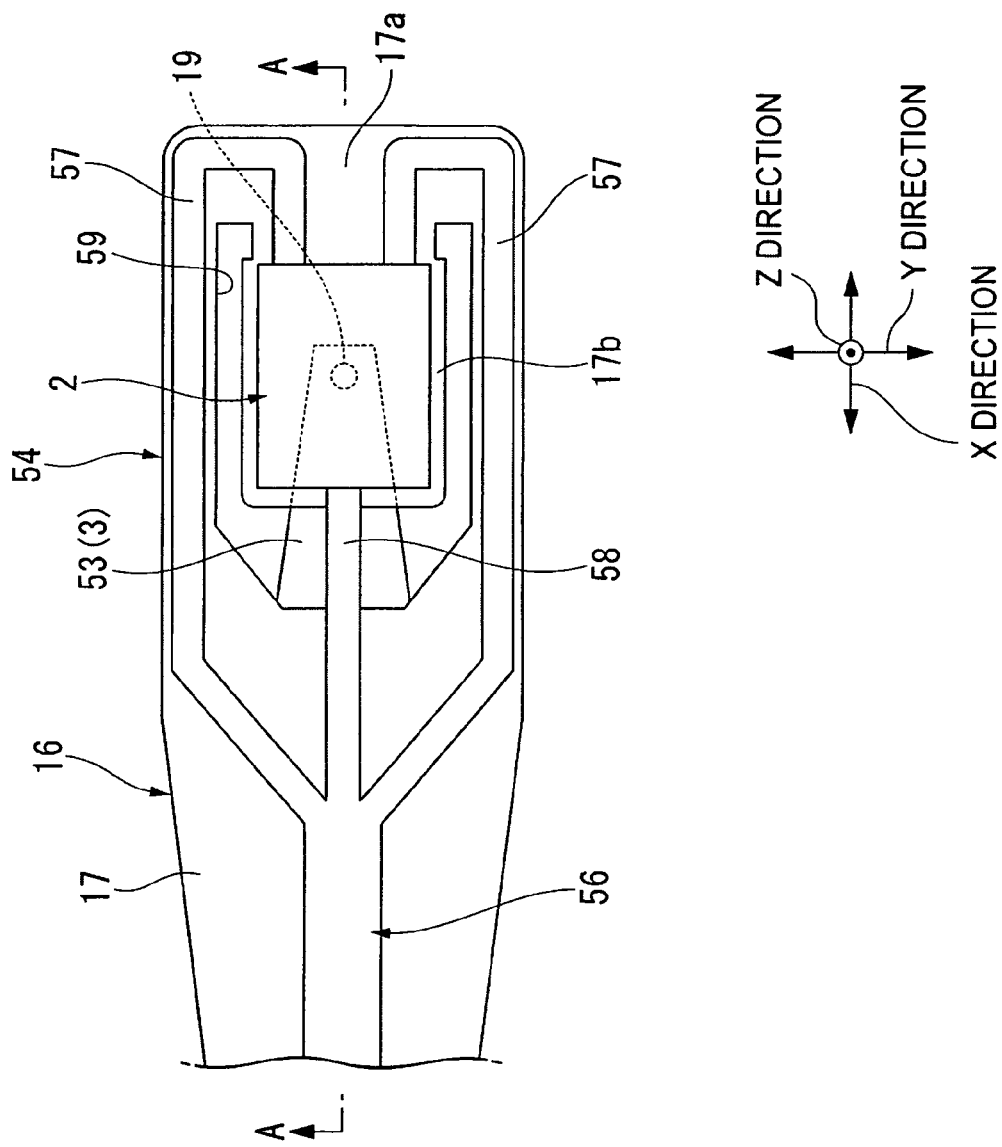
FIG. 3 is a plan view of a gimbal shown in FIG. 2.
Figure 4:
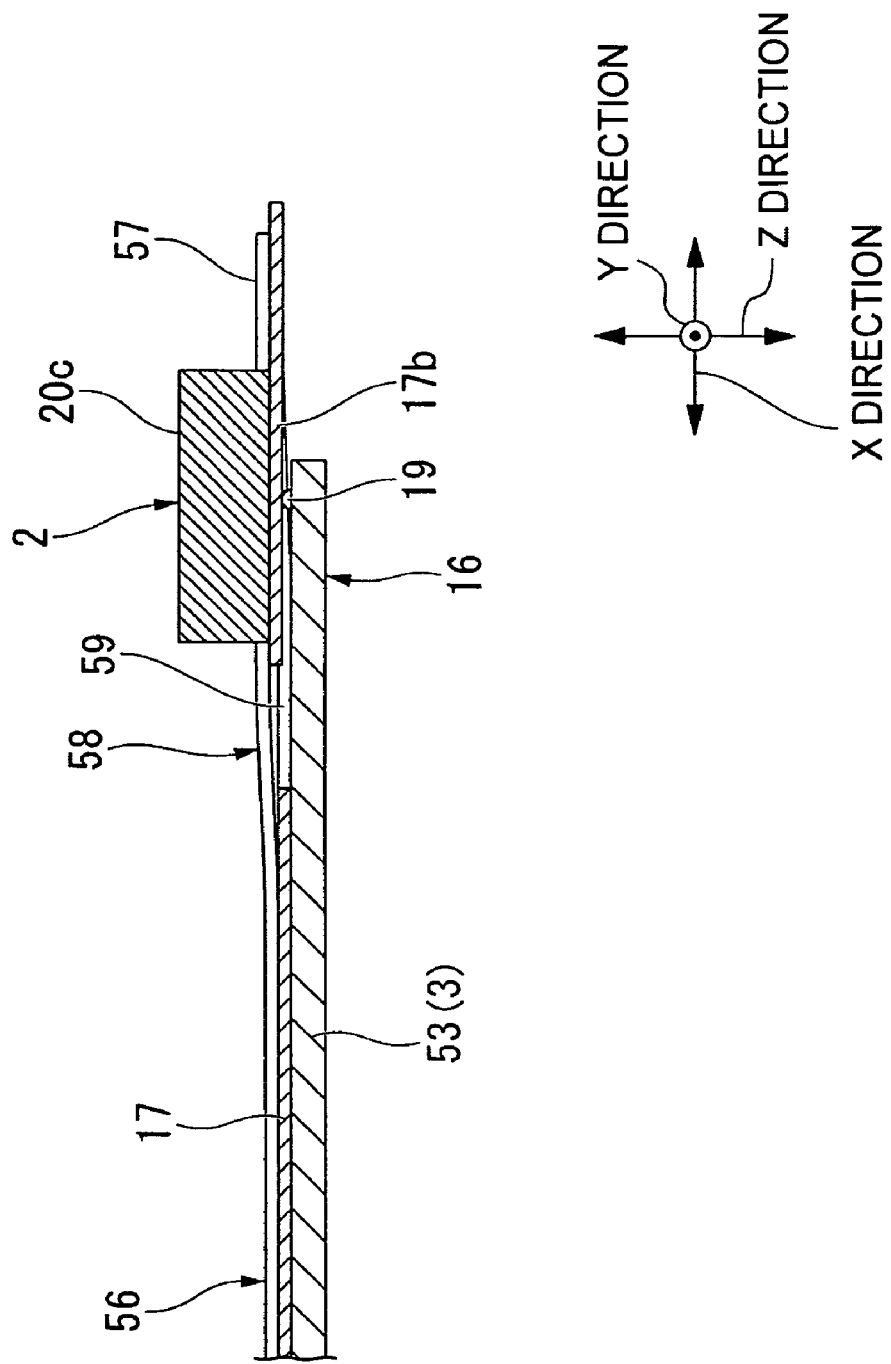
FIG. 4 is a cross-sectional view along lines A-A shown in FIG. 3.

FIG. 2 is a perspective view that views the suspension from the recording and playback head side in the state of making the recording and playback head upward. FIG. 3 is a plan view that views the gimbal in the state of making the recording and playback head upward. FIG. 4 is a cross-sectional view along lines A-A' of FIG. 3, and FIG. 5 is an enlarged cross-sectional view of the recording and playback head.

As shown in FIGS. 2 to 5, the head gimbal assembly 12 of the present embodiment has a function that causes the recording and playback head 2 to float from the disk D, and includes the recording and playback head 2, the suspension 3 that is formed in a thin plate shape by a metallic material and can be moved in the XY direction parallel to the disk surface D1, and gimbal means 16 for fixing the recording and playback head 2 to a lower surface of the suspension 3 in the state of being freely rotatable around two axes (the X axis and the Y axis) parallel to the disk surface D1 and perpendicular to each other, that is, so as to be twistable around the two axes.

(Suspension)

As shown in FIGS. 2 to 4, the suspension 3 mentioned above is constituted by a base plate 51 that is formed in an approximately rectangular shape when viewed from the upper surface, and a rod beam 53 of an approximately triangular shape when viewed from the plan view that is connected to the tip side of the base plate 51 via a hinge plate 52.

The base plate 51 is formed of a thin metallic material having a thin thickness such as stainless steel, and the proximal end side thereof is formed with an opening 51a penetrating in a thickness direction. Moreover, the base plate 51 is fixed to the tip of the arm portion 14 via the opening 51a.

On the lower surface of the base plate 51, the sheet-like hinge plate 52 formed of a metallic material such as stainless steel is disposed. The hinge plate 52 is a plate material of a flat plate shape formed over the whole surfaces of the lower surface of the base plate 51, and the tip portion thereof is formed as an extension portion 52a that is extended from the tip of the base plate 51 along the longitudinal direction of the base plate 51. Two extension portions 52a are extended from both end portions of the hinge plate 52 in the width direction, and the rod beam 53 is connected to the tip portion thereof.

Like the base plate 51, the rod beam 53 is formed of a metallic material having a thin thickness such as stainless steel, and the proximal end thereof is connected to the hinge plate 52 with a gap between the proximal end and the tip of the base plate 51.

As a result, the suspension 3 is bent around between the base plate 51 and the rod beam 53, and is easily bent toward a Z direction perpendicular to the disk surface D1.

Furthermore, a flexure 54 is provided on the suspension 3.

The flexure 54 is a sheet-like member formed of a metallic material such as stainless steel, and is configured so that it can be subject to deflection deformation by being formed in the sheet shape. Furthermore, the flexure 54 is constituted by a gimbal 17 that is fixed to the tip side of the rod beam 53 and has an exterior shape formed in an approximately pentagonal shape when viewed from the upper surface, and a supporter 18 that is formed to have width narrower than the gimbal 17 and is extended from the proximal end of the gimbal 17 along the upside of the suspension 3.

The gimbal 17 is formed so as to be slightly bent from the vicinity of the middle thereof toward the disk surface D1 over the tip in thickness direction. Moreover, the tip side added with the bent state is fixed to the rod beam 53 from the proximal end side over the approximately vicinity of the middle so as not to come into contact with the rod beam 53. Furthermore, the tip side of the gimbal 17 of the floating state is formed with a notch portion 59 that is hollowed in a U shape at a periphery thereof. A portion surrounded by the notch portion 59 is formed with a pad portion 17b that is supported by the connection portion 17a in a cantilever shape.

That is, the pad portion 17b is formed so as to overhang from the tip side of the gimbal 17 toward the proximal end thereof by the connection portion 17a, and includes the notch portion 59 therearound.

As a result, the pad portion 17b is easily bent in the thickness direction of the gimbal 17, and only the pad portion 17b is subjected to the angle adjustment so as to be parallel to the lower surface of the suspension 3. Moreover, the recording and playback head 2 is mounted and fixed on the pad portion 17b. That is, the recording and playback head 2 is in the state of hanging on the rod beam 53 via the pad portion 17b.

Furthermore, as shown in FIGS. 3 and 4, the tip of the rod beam 53 is formed with a protrusion portion 19 that is protruded toward the approximately centers of the pad portion 17b and the recording and playback head 2. The tip of the protrusion portion 19 is in a round state. Moreover, the protrusion portion 19 comes into point-contact with the surface (the upper surface) of the pad portion 17b when the recording and playback head 2 floats to the rod beam side 53 by the wind pressure received from the disk D.

That is, the protrusion portion 19 is adapted to support the recording and playback head 2 via the pad portion 17b of the gimbal 17 and gives the recording and playback head 2 the load toward the disk surface D1 (toward the Z direction).

In addition, the gimbal 17 having the protrusion portion 19 and the pad portion 17b constitutes the gimbal means 16.

The supporter 18 shown in FIG. 2 is a sheet-like member that is formed integrally with the gimbal 17, and is extended on the suspension 3 toward the arm portion 14. That is, the supporter 18 is configured so as to follow the deformation of the suspension 3 when the suspension 3 is deformed. Furthermore, the supporter 18 runs around the side from the upside of the arm portion 14 and is routed up to the base portion 15 of the carriage 11.

(Recording and Playback Head)

Figure 6:
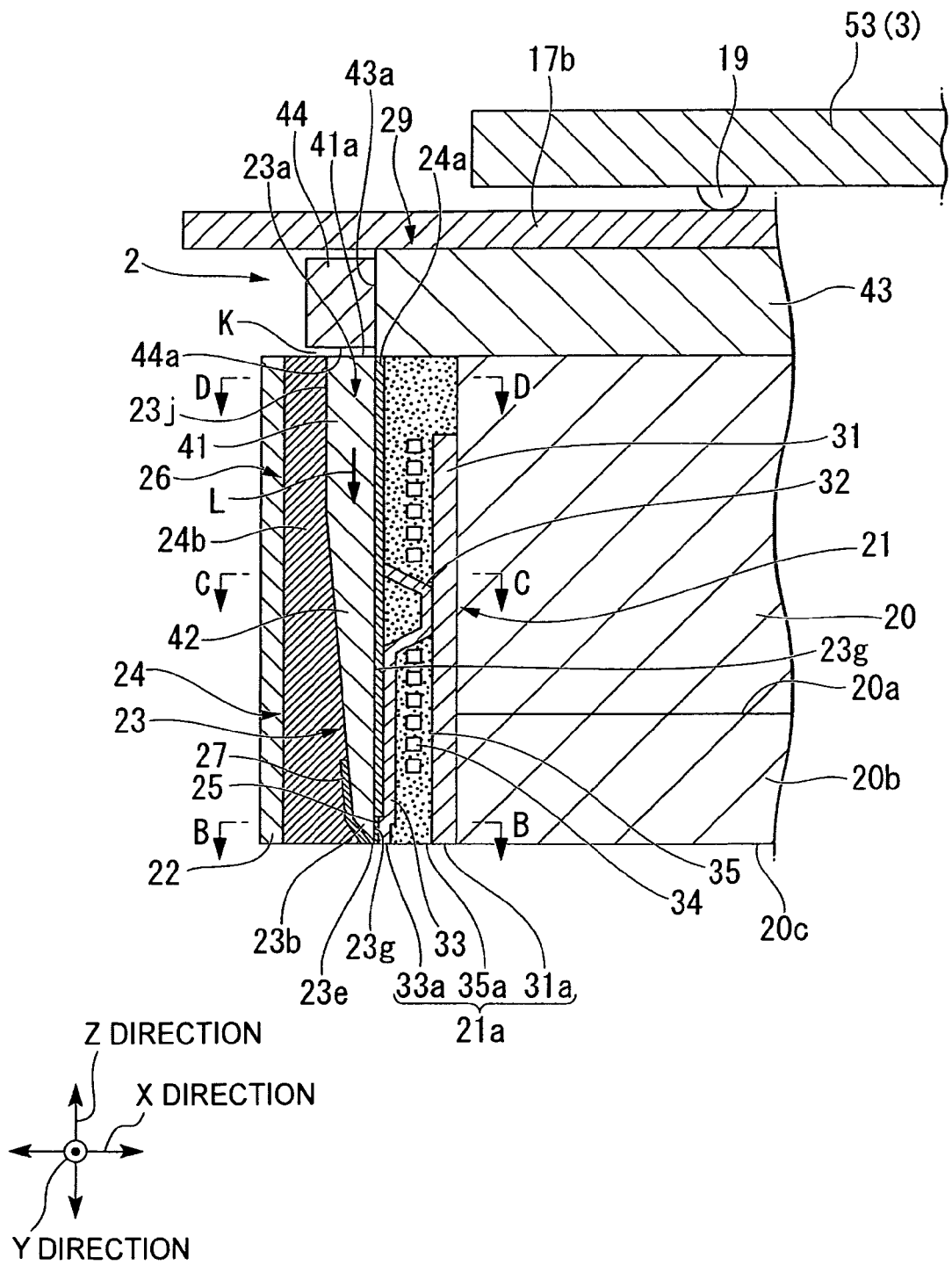
FIG. 6 is an enlarged cross-sectional view of a side of an outflow end side (a front side) of the recording and playback head.

FIG. 6 is an enlarged cross-sectional view of a side surface of an outflow end side of the recording and playback head.

The recording and playback head 2 is supported so as to interpose the gimbal 17 described later on the lower surface of the suspension 3 in the state of being disposed between the disk D and the suspension 3.

Specifically, as shown in FIGS. 5 and 6, the recording and playback head 2 is a head that records and plays back various pieces of information on the disk D which rotates using the near-field light R created from the laser light L. The recording and playback head 2 includes a slider 20 that is disposed opposite to the disk D in the state of floating from the disk surface D1 by a predetermined distance H, a recording element 21 that records information on the disk D, a playback element 22 that plays information recorded on the disk D, a near-field light generating element 26 that propagates the laser light L while focusing the same and emits the near-field light R to the outside after forming the same, and a laser light source 29 that emits the laser light L toward the near-field light generating element 26.

The slider 20 is formed in a rectangular shape by a light transmissive material such as quartz glass, ceramic such as AlTiC (altic) or the like. The slider 20 has a facing surface 20a that faces the disk D, and is supported on the pad portion 17b mentioned above via a laser mount 43 described later.

Furthermore, the facing surface 20a is formed with a convex portion 20b that generates the pressure for floating from the viscosity of the air flow generated by the rotating disk D. The convex portion 20b is formed so as to be extended along the longitudinal direction (the X direction). Two convex portions 20b are formed in the left and right (the Y direction) at intervals so as to be aligned in a rail shape. The convex portion 20b is not limited to this case, but may have any concave and convex shape if the convex portion 20b is designed so as to adjust a positive pressure trying to separate the slider 20 from the disk surface D1 and a negative pressure trying to attract the slider 20 to the disk surface D1, thereby causing the slider 20 to float in an optical state. In addition, the surface of the convex portion 20b is called an ABS (Air Bearing Surface) 20c.

Moreover, the slider 20 receives a force that floats the slider 20 from the disk surface D1 by two convex portions 20b. Meanwhile, the suspension 3 is bent in the Z direction perpendicular to the disk surface D1 and absorbs the floating force of the slider 20. That is, the slider 20 receives a force pressed to the disk surface D1 side by the suspension 3 when floating. Thus, the slider 20 floats in the state of being separated from the disk surface D1 by a predetermined distance H as mentioned above by the balance between both forces. In addition, since the slider 20 is rotated about the X axis and the Y axis by the gimbal means 16, the slider 20 floats in the state in which the posture is always stable.

Additionally, the air flow generated together with the rotation of the disk D flows from an inflow end side (a proximal end side of the X direction of the suspension 3) of the slider 20, then flows along the ABS 20c, and is discharged from an outflow end side (a tip side of the X direction of the suspension 3) of the slider 20.

Hereinafter, the inflow end side (a leading edge side) of the slider 20, that is, an X direction right side in FIG. 5 is called "rear", and the outflow end side (a trailing edge side) of the slider 20, that is, an X direction left side in FIG. 5 is called "front". Furthermore, in the recording and playback head 2, the disk surface D1 side, that is, a Z direction downside in FIG. 5 is called "a lower part" and an opposite side thereof, that is, a Z direction upside in FIG. 5 is called "an upper part".

The recording element 21 is an element that generates the recording magnetic field from the facing surface 21a facing the disk surface D1 shown in FIG. 5, applies the recording magnetic field to the disk D, and records information. The recording element 21 is held in the front end portion of the slider 20 as shown in FIG. 6. The recording element 21 is equipped with a return pole 31 that is fixed to the front end surface (front end surface) of the slider 20, a main magnetic pole 33 that is installed in front of the return pole 31 and is connected to the return pole 31 via the magnetic circuit 32, and a coil 34 that is wound about the magnetic circuit 32 around the magnetic circuit 32.

That is, the return pole 31, the magnetic circuit 32, the coil 34, and the main magnetic pole 33 are sequentially disposed side by side facing forward from the front end surface of the slider 20.

Both magnetic poles 31, 33 and the magnetic circuit 32 are formed by a high saturation magnetic flux density (Bs) material (for example, CoNiFe alloy, CoFe alloy or the like) having a high magnetic flux density. Furthermore, the coil 34 is disposed so that gaps are formed between the adjacent coil lines, between the coil 34 and the magnetic circuit 32, and between the coil 34 and both magnetic poles 31 and 33 so as not to be shorted, and is molded by an insulator 35 in this state. Moreover, coil 34 is supplied with the electric current modulated depending on information from the control portion 8 (see FIG. 1). That is, the magnetic circuit 32 and the coil 34 constitute an electromagnet as a whole. Furthermore, the respective facing surfaces 33a, 31a, and 35a (the Z direction end surface) of the main magnetic pole 33, the return pole 31, and the insulator 35 facing the disk surface D1 are formed as the same plane as the ABS 20c of the slider 20. In the recording element 21 having the configuration mentioned above, the electric current is supplied to the coil 34, whereby the recording magnetic field is generated in which a line of magnetic force exits the facing surface 33a of the main magnetic pole 33 and enters the facing surface 31a of the return pole 31.

As shown in FIGS. 5 and 6, the near-field light generating element 26 is an element that generates the near-field light R from the facing surface 26a facing the disk surface D1, and is disposed in front of the recording element 21 (at the opposite side of the return pole 31 to the main magnetic pole 33 shown in FIG. 6). The near-field light generating element 26 includes a core 23 provided so that a tip thereof is extended vertically toward the disk surface D1, a metal film 25 that is placed in close contact with the side (the side surface 23g) of the main magnetic pole 33 side in the lower end portion of the core 23, a light shielding film 27 that covers the lower end portion of the core 23, and a cladding 24 that seals the core 23 in close contact with the side of the core 23.

Figure 7A:
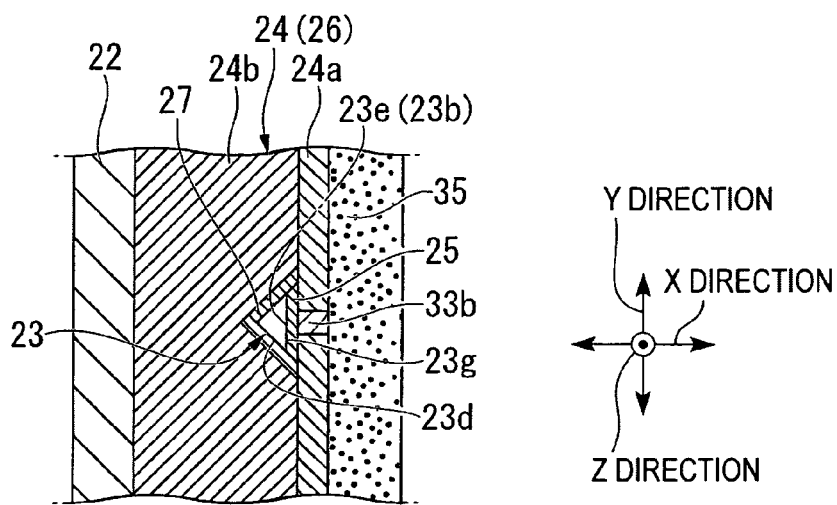
FIG. 7A is a cross-sectional view along lines B-B of FIG. 6.
Figure 7B:
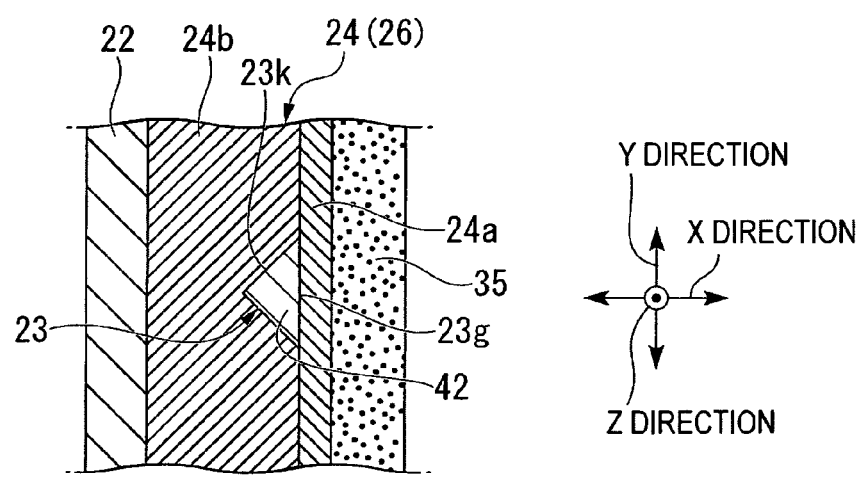
FIG. 7B is a cross-sectional view along lines C-C of FIG. 6.
Figure 7C:
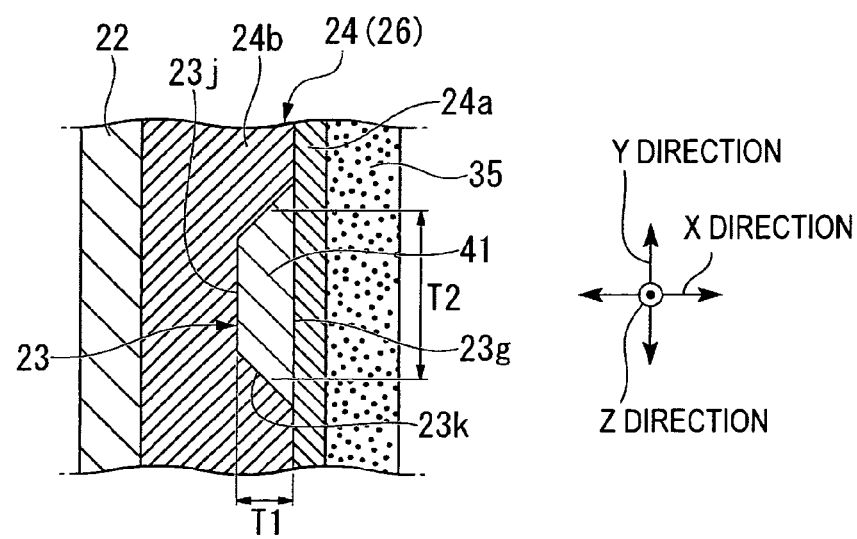
FIG. 7C is a cross-sectional view along lines D-D of FIG. 6.

FIG. 7A is a cross-sectional view along lines B-B of FIG. 6, FIG. 7B is a cross-sectional view along lines C-C of FIG. 6, and FIG. 7C is a cross-sectional view along lines D-D of FIG. 6. Furthermore, FIG. 8 is a perspective view of the core.

As shown in FIGS. 7A to 7C and 8, the core 23 is a light flux propagating member that propagates the laser light L entered from the upper end side (the proximal end side) while focusing the laser light L toward the lower end side (the tip side). The core 23 is progressively drawn from the upper end side to the lower end side, and can propagate the laser light L while gradually focusing the same in the inner portion. Specifically, the core 23 has a light flux focusing portion 23a and a near-field light creating portion 23b from the upside.

The light flux focusing portion 23a is a portion that is drawn so that a cross-sectional area (a cross-sectional area of the XY direction) perpendicular to the Z direction facing from the upper end side to the lower end side is progressively reduced, and the light flux focusing portion 23a propagates the introduced laser light L toward the lower portion while focusing the same. That is, the spot size of the laser light L introduced to the light flux focusing portion 23a can gradually be narrowed to the small size. Specifically, the light flux focusing portion 23a includes a trapezoidal portion 41 (see FIG. 7C) in which a cross-sectional shape (an incident side end surface) viewed from the Z direction at the upper end side is formed in a trapezoidal shape, and a triangular portion 42 (see FIG. 7B) which is integrally connected to the lower end portion of the trapezoidal portion 41 and in which a cross-sectional shape viewed from the Z direction is formed in a triangular shape.

Figure 8:
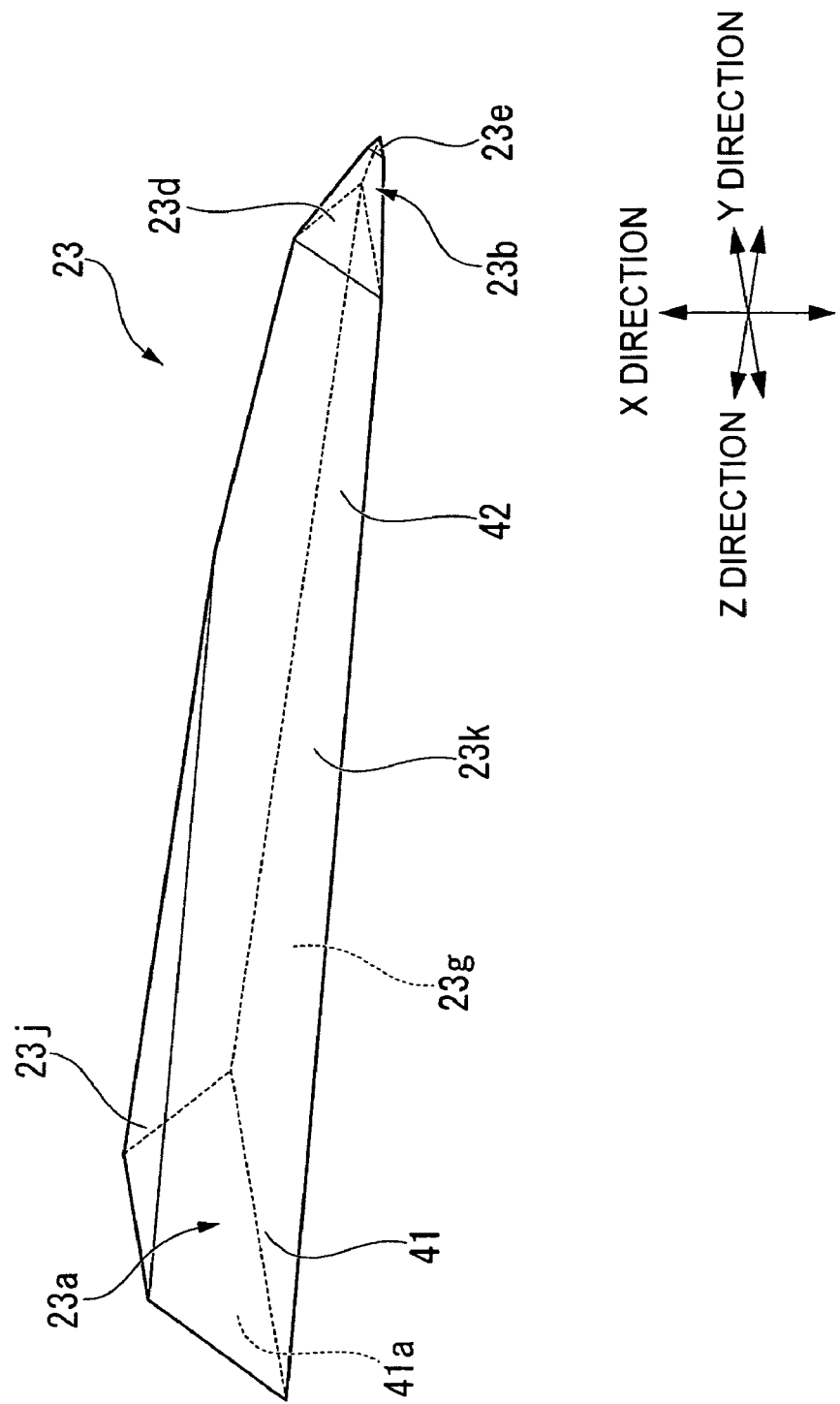
FIG. 8 is a perspective view of the core.

As shown in FIGS. 7C and 8, the trapezoidal portion 41 is formed in a flat shape in which a left and right direction is a longitudinal direction (the Y direction) and a front and rear direction is a transverse direction (the X direction). Specifically, the trapezoidal portion 41 includes a rear side surface 23g, a pair of sides 23k that is extended so as to be tapered from the left and right both ends (both ends of the Y direction) of the side surface 23g toward the playback element 22, and a side surface 23j that is extended parallel to the side surface 23g and bridges the pair of sides 23k. The trapezoidal portion 41 is formed so that the lengths (widths in the Y direction) of both bottom surfaces (the rear side surface 23g and the front side surface 23j) are progressively reduced forward the lower end side. Furthermore, the upper end surface 41a (the upper end surface of the core 23) of the trapezoidal portion 41 is formed as the same plane as the upper surface of the slider 20 and is exposed toward the outside.

As shown in FIGS. 7B and 8, the triangular portion 42 is configured so that the bottom surface and a pair of slope surfaces are constituted by the side surface 23g and the side surface 23k mentioned above. The triangular portion 42 is formed so that the length of the bottom surface (the side surface 23g) and the length of the slope surface (the side surface 23k) are progressively reduced toward the lower end side.

As shown in FIGS. 7A and 8, the near-field light creating portion 23b is a portion that is further drawn from the lower end portion of the triangular portion 42 in the light flux focusing portion 23a toward the lower part. The near-field light creating portion 23b is configured so that the cross-sectional shape (the emitting side end surface) viewed from the Z direction is formed in a triangular shape. Specifically, the near-field light creating portion 23b is configured so that the bottom surface is constituted by the side surface 23g and the side surface 23g is disposed so as to be opposed to the main magnetic pole 33. The near-field light creating portion 23b is formed with a pair of sides 23d from both ends (both ends of the Y direction) of the side surface 23g toward the playback element 22 (toward the X direction). The sides 23d are extended in the state of sloping to the optical axis (the Z direction) of the laser light L, whereby the lower end side of the near-field light creating portion 23b is in a pointed state. Furthermore, an end surface 23e exposed to the outside in the lower end side of the near-field light creating portion 23b is formed in a triangular shape. The end surface 23e is formed as the same plane as the facing surface 21a (the respective facing surfaces 33a, 31a, and 35a of the main magnetic pole 33, the return pole 31, and the insulator 35) of the recording element 21 or the ABS 20c of the slider 20. That is, in the core 23, an upper end surface 41a of the trapezoidal portion 41 constitutes an incident side end surface of the laser light L emitted from the laser light source 29, and the end surface 23e of the near-field light creating portion 23b constitutes an emitting side end surface of the laser light L.

As shown in FIGS. 6 and 7A to 7C, the cladding 24 is formed of a material having a refractive index lower than the core 23, comes into close contact with the side surfaces 23d, 23g, 23j, and 23k, and is a mold member that seals the core 23 in the state of exposing the upper and lower both end surfaces 41a and 23e of the core 23 to the outside. Specifically, the cladding 24 includes a first cladding 24a that is formed so as to cover the core 23 from the backside between the core 23 and the recording element 21 (the main magnetic pole 33), and a second cladding 24b that is formed so as to cover the core 23 from the front side between the core 23 and the playback element 22. In this manner, since the first cladding 24a and the second cladding 24b come into close contact with the side surfaces 23d, 23g, 23j, and 23k of the core 23, a gap is not generated between the core 23 and the cladding 24.

In addition, an example of the combination of materials used as the cladding 24 and the core 23 will be described. For example, a combination is considered in which the core 23 is formed of quartz ($SiO_2$), and the cladding 24 is formed of quartz doped with fluorine. In this case, when the wavelength of the laser light L is 400 nm, since the refractive index of the cores 23 is 1.47 and the refractive index of the cladding 24 is less than 1.47, the combination is preferable.

Furthermore, a combination is also considered in which the core 23 is formed of quartz doped with germanium, and the cladding 24 is formed of quartz ($SiO_2$). In this case, when the wavelength of the laser light L is 400 nm, since the refractive index of the cores 23 becomes greater than 1.47 and the refractive index of the cladding 24 is 1.47, the combination is also preferable.

Particularly, the higher the refractive index difference between the cores 23 and the cladding 24 is, the greater the force restraining the laser light L in the cores 23 is. Thus, it is desirable that tantalum oxide ($Ta_2O_5$: the refractive index is 2.16 when the wavelength is 550 nm) be used in the core 23, and quartz, alumina ($Al_2O_3$) or the like be used in the cladding 24, thereby increasing the refractive index difference between them. Furthermore, in the case of using the laser light L of the infrared region, it is also effective that the core 23 is formed by silicon (Si; the refractive index is about 4) that is a material transparent to infrared light.

As shown in FIGS. 6 and 7A, the metal film 25 generates the near-field light R (see FIG. 9) from the laser light L propagated through the inner portion of the core 23, localizes the near-field light R between the facing surface 26a (see FIG. 5) of the near-field light generating element 26 and the disk surface D1 shown in FIG. 5, and is formed of, for example, gold (Au), platinum (Pt) or the like. The metallic film 25 is placed on the side surface 23g of the lower end side (the near-field light creating portion 23b) in the core 23 and comes into contact with the first cladding 24a and the tip portion 33b of the main magnetic pole 33 exposed from the first cladding 24a.

The light shielding film 27 shields light entered from the outside to the near-field light creating portion 23b, and is formed of a material having high reflectivity such as aluminum (Al). The light shielding film 27 is formed so as to cover the side surface 23d of the near-field light creating portion 23b. That is, the near-field light creating portion 23b is configured so that the side surface 23g is covered with the metal film 25 and the side surface 23d is covered with the light shielding film 27. In addition, in the present embodiment, the light shielding film 27 is formed more extensively than the metal film 25 in the Z direction, but the light shielding film 27 may be formed within the range equal to or greater than the metal film 25 in the Z direction.

The playback element 22 is a magneto-resistance effect film in which the electric resistance is converted depending on the magnitude of the magnetic field leaking from the perpendicular recording layer d2 (see FIG. 5) of the disk D. The playback element 22 is formed on the front end surface of the cladding 24 (the second cladding 24b) of the opposite side of the recording element 21 with the near-field light generating element 26 interposed therebetween. The playback element 22 is supplied with the bias electric current from the control portion 8 via an electric wiring 56 described later. As a result, the control portion 8 can detect a change in electric field leaking from the disk D as a change in voltage, and can perform the playback of the signal from the change in voltage.

A laser light source 29 is mounted on the slider 20 of the recording and playback head 2 described above. The laser light source 29 has a laser mount 43 that is fixed to the upper surface of the slider 20, and a semiconductor laser chip 44 that is fixed to a front end surface 43a of the laser mount 43.

The laser mount 43 is a plate-like member which is formed of, for example, the same material as the slider 20 and in which the exterior in the XY direction is formed equally with the slider 20. The upper surface side of the laser mount 43 is fixed to the pad portion 17b described later of the gimbal 17. That is, the slider 20 is fixed to the pad portion 17b in the state of interposing the laser mount 43 between the slider 20 and the pad portion 17b. In addition, although it is not shown, the electric wiring 56 (see FIG. 5) described later is fixed to the laser mount 43 and is electrically connected to an electrode pad (not shown) formed on the front end surface 43a of the laser mount 43.

The semiconductor laser chip 44 is installed on an electrode pad (not shown) formed on the front end surface 43a of the laser mount 43. In this case, the semiconductor laser chip 44 is placed in the state of facing downward the emitting side end surface 44a of the laser light L and so as to face the upper end surface 41a of the trapezoidal portion 41 of the core 23. In addition, the semiconductor laser chip 44 of the present embodiment emits the laser light L having the spot shape of the elliptical shape in which the X direction is the short axis direction and the Y direction is the long axis direction. Furthermore, a gap K is formed between the emitting side end surface 44a of the semiconductor laser chip 44 and the upper end surface 41a of the trapezoidal portion 41, but oil or the like having the same refractive index as the core 23 may be interposed in the gap K.

Herein, the shape of the upper end surface 41a of the trapezoidal portion 41 mentioned above is formed so as to match the spot shape of the laser light L at the time of being emitted from the semiconductor laser chip 44 and entered to the upper end surface 41a. In the present embodiment, as shown in FIG. 7C, a length T1 (a length between the side surfaces 23g and 23h) of the transverse direction (the front and rear direction) of the upper end surface 41a is formed so as to be equal to or greater than the length of the laser light L in the short axis direction, and a width T2 of the longitudinal direction (the left and right direction) in the middle portion of the front and rear direction is formed so as to be equal to or greater than the length of the long axis direction of the laser light L.

In addition, as shown in FIG. 5, as the disk D of the present embodiment, a vertical two-layer film disk D is used which is constituted by at least two layers of a perpendicular recording layer d2 having an axis that is easily magnetized in a direction perpendicular to the disk surface D1 and a soft magnetic layer d3 formed of a high permeability material. As such a disk D, for example, a disk is used in which the soft magnetic layer d3, an intermediate layer d4, the perpendicular recording layer d2, a protective layer d5, and a lubricant layer d6 are sequentially formed on the substrate d1.

As the substrate d1, for example, an aluminum substrate, a glass substrate or the like is used. The soft magnetic layer d3 is a high permeability layer. The intermediate layer d4 is a crystal control layer of the perpendicular recording layer d2. The perpendicular recording layer d2 is a vertical anisotropic magnetic layer, and, for example, uses CoCrPt-based alloy. The protective layer d5 protects the perpendicular recording layer d2, and, for example, a DLC (diamond-like-carbon) film. The lubricant layer d6 uses, for example, a fluorine-based liquid lubricant.

As shown in FIG. 1, a terminal substrate 55 is placed on the side surface 15c in the base portion 15 of the carriage 11. The terminal substrate 55 is a relay point during electrical connection of the control portion 8 provided in the housing 9 with the recording and playback head 2, and the surface thereof is formed with various control circuits (not shown).

The control portion 8 and the terminal substrate 55 are electrically connected by a flat cable 4 having flexibility, and the terminal substrate 55 and the recording and playback head 2 are connected to each other by an electric wiring 56. Three sets of electric wirings 56 are provided corresponding to the recording and playback heads 2 provided for each carriage 11, whereby the electric current modulated to the signal output from the control portion 8 via the flat cable 4 depending on information is supplied to the recording and playback head 2 via the electric wiring 56.

The electric wiring 56 is routed on the arm portion 14 through the side surface of the arm portion 14 from the surface of the terminal substrate 55. Specifically, as shown in FIGS. 2 to 4, the electric wiring 56 is placed on the supporter 18 of the flexure 54 on the arm portion 14 and the suspension 3, and is routed to the tip of the suspension 3 in the state of interposing the supporter 18 therebetween.

Moreover, the electric wiring 56 is branched into a first electric wiring 57 for supplying the playback element 22 and the recording element 21 with the electric current in the tip (the intermediate position of the gimbal 17) of the suspension 3, and a second electric wiring 58 for supplying the laser light source 29 with the electric current.

Specifically, the first electric wiring 57 is bent toward an outer peripheral portion of the gimbal 17 in the branching portion at the tip side of the electric wiring 56, and is routed from the outer peripheral portion (the outside of the notch portion 59) of the gimbal 17. Moreover, the first electric wiring 57 routed from the outside of the notch portion 59 is connected to the front end surface side of the recording and playback head 2 through the upper portion of the connection portion 17a. That is, the first electric wiring 57 is directly connected to each of the playback element 22 and the recording element 21 provided at the front end surface side of the slider 20 from the outside of the recording and playback head 2.

Meanwhile, the second electric wiring 58 is extended along the longitudinal direction (the X direction) of the gimbal 17 from the branching point as mentioned above, and is directly connected to the laser mount 43 from the rear end surface side of the recording and playback head 2 across the notch portion 59 of the gimbal 17. Moreover, the second electric wiring 58 is connected to the electrode pad formed on the front end surface 43a of the laser mount 43, and supplies the semiconductor laser chip 44 with the electric current via the electrode pad. Furthermore, the second electric wiring 58 is separated from the lower surface of the gimbal 17 in the branching point, and is extended in the state of slightly floating so as to pass over between the pad portion 17b and the gimbal 17 as the second electric wiring 58 goes from the branching point toward the front end surface side of the recording and playback head 2. That is, on the lower surface of the gimbal 17, the second electric wiring 58 is routed from the center portion of the recording and playback head 2 in the width direction (the Y direction) to the backside of the recording and playback head 2 in the state of being approximately linearly extended (the radius of curvature is approximately infinite).

(Information Recording and Playback Method)

Next, a case will be described below where various pieces of information are recorded and played on the disk D by the information recording and playback apparatus 1 configured in this manner.

Firstly, as shown in FIG. 1, the spindle motor 6 is driven and the disk D is rotated in a certain direction. Next, the actuator 5 is operated, and the suspension 3 is scanned via the carriage 11 in the XY direction. As a result, the recording and playback head 2 can be situated at a desired position on the disk D. At this time, the recording and playback head 2 receives force that floats by the two convex portions 20b formed on the facing surface 20a of the slider 20, and is pressed to the disk D side by the suspension 3 or the like by a predetermined force. As shown in FIG. 2, the recording and playback head 2 floats to a position separated from the upper portion of the disk D by a predetermined distance H by the balance of both forces.

Furthermore, even when the recording and playback head 2 receives the wind pressure generated due to the undulation of the disk D, since the displacement of the Z direction is absorbed by the suspension 3 and the recording and playback head 2 can be displaced around the XY axis by the gimbal 17, the wind pressure due to the undulation can be absorbed. For this reason, it is possible to cause the recording and playback head 2 to float in a stable state.

Figure 9:
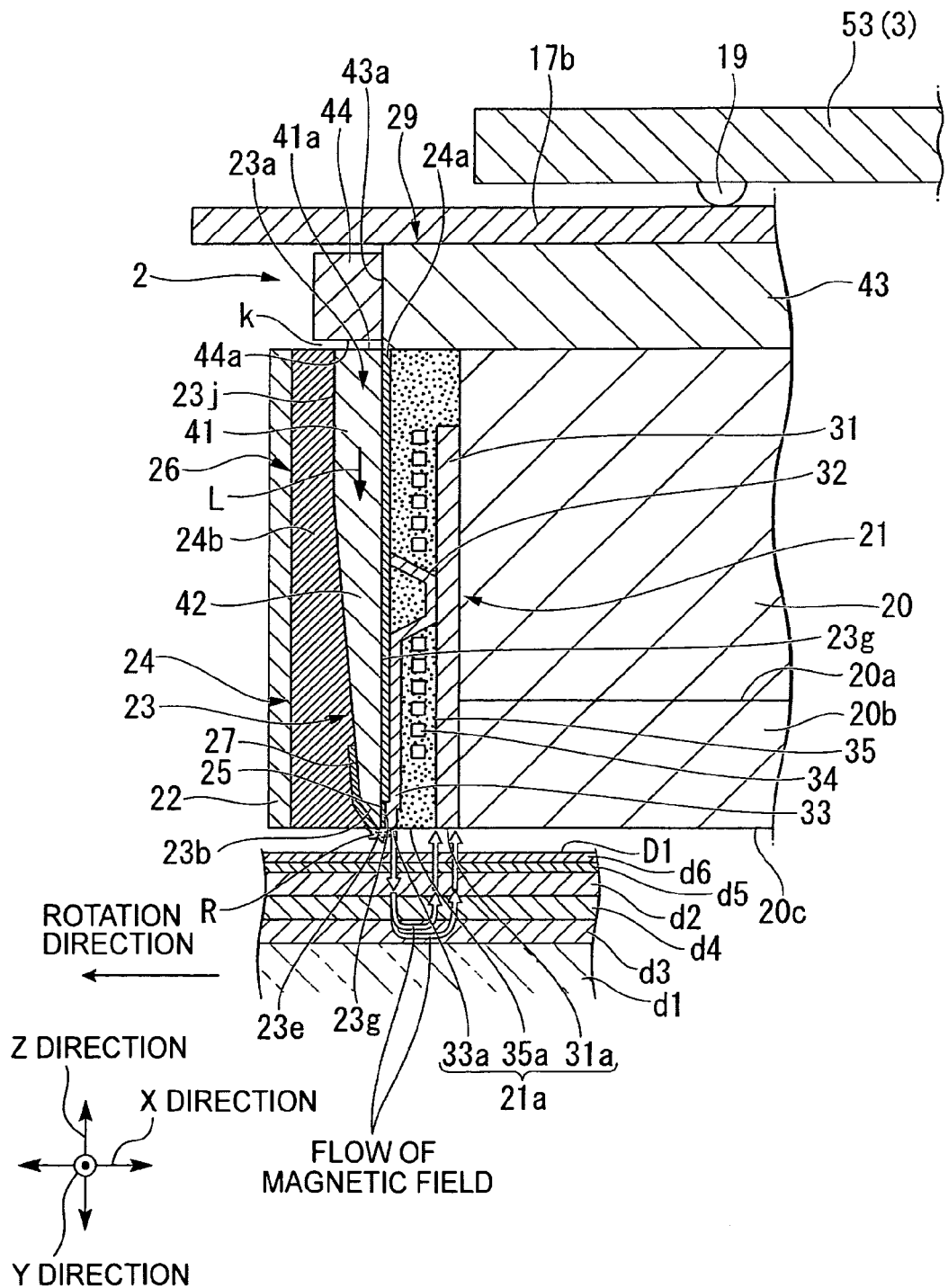
FIG. 9 is an explanatory diagram when recording and playing back the information by the information recording and playback apparatus and is an enlarged cross-sectional view corresponding to FIG. 6.

FIG. 9 is an explanatory diagram of recording and playing back information by the information recording and playback device and is a cross-sectional view corresponding to FIG. 6.

Herein, in the case of performing the recording of information, as shown in FIG. 9, the control portion 8 operates the laser light source 29 so as to emit the laser light L, and supplies the electric current modulated depending on information to the coil 34 so as to operate the recording element 21.

Firstly, the laser light L is emitted from the laser light source 29, and the laser light L is entered from the upper end surface 41a of the core 23 into the light flux focusing portion 23a of the core 23. The laser light L propagated through the inner portion of the light flux focusing portion 23a is propagated toward the lower end side situated at the disk D side while repeating the total reflection between the core 23 and the cladding 24. Particularly, since the cladding 24 is in close contact with the side surfaces 23k and 23d of the core 23, light does not leak to the outside of the core 23. Thus, the introduced laser light L is propagated to the lower end side while being narrowed without being wasted and can be entered to the near-field light creating portion 23b.

At this time, the core 23 is drawn so that the cross-sectional area perpendicular to the Z direction is progressively reduced. For this reason, the laser light L is gradually narrowed as the laser light L is propagated through the inner portion of the light flux focusing portion 23a, whereby the spot size is reduced.

The laser light L having the small spot size is continuously entered to the near-field light creating portion 23b. The near-field light creating portion 23b is further drawn toward the lower end side, and the end surface 23e has the size equal to or less than the wavelength of light. In this case, two side surfaces 23d of the near-field light creating portion 23b are shielded by the light shielding film 27. Thus, the laser light L entered to the near-field light creating portion 23b is propagated while being reflected by the interface between the light shielding film 27 and the near-field light creating portion 23b without leaking to the second cladding 24b side. Moreover, when the laser light L propagated through the near-field light creating portion 23b is incident to the metal film 25, surface plasmon is excited to the metal film 25. The excited surface plasmon is propagated toward the lower end side of the core 23 along the interface between the metal film 25 and the core 23 (the near-field light creating portion 23b) while being enhanced by a resonance effect. Moreover, when reaching the lower end side, the surface plasmon becomes the near-field light R having strong light intensity and leaks to the outside. That is, it is possible to localize the near-field light R between the lower end side of the near-field light generating element 26 and the disk D. Then, the disk D is locally heated by the near-field light R, and the coercive force is temporarily lowered.

Meanwhile, when the electric current is supplied to the coil 34 by the control portion 8, since the electric current magnetic field generates the magnetic field in the magnetic circuit 32 by the principle of an electromagnet, it is possible to generate the recording magnetic field of the vertical direction on the disk D between the main magnetic pole 33 and the return pole 31. Then, the magnetic flux generated from the main magnetic pole 33 directly exits the perpendicular recording layer d2 of the disk D and reaches the soft magnetic layer d3. As a result, it is possible to perform the recording in the state in which the magnetization of the perpendicular recording layer d2 faces perpendicular to the disk surface D1. Furthermore, the magnetic flux reaching the soft magnetic layer d3 returns to the return pole 31 via the soft magnetic layer d3. At this time, the magnetic flux is not influenced in the direction of the magnetization when returning to the return pole 31. This is because an area of the return pole 31 facing the disk surface D1 is greater than the main magnetic pole 33, and thus, force is not generated by which the magnetic flux density greatly inverts the magnetization. That is, the recording can be performed only at the main magnetic pole 33 side.

As a consequence, the recording of information can be performed by a hybrid magnetic recording type in which the near-field light R cooperates with the recording magnetic field generated in both magnetic poles 31 and 33. In addition, since the recording is performed by the perpendicular recording type, the recording is hardly affected by the thermal fluctuation phenomenon or the like, and thus, the stable recording can be performed. Thus, reliability of writing can be improved.

Additionally, in the case of playing back information recorded on the disk D, when the coercive force of the disk D is temporarily lowered, the playback element 22 receives the magnetic field leaking from the perpendicular recording layer d2 of the disk D, and the electric resistance is changed depending on the magnitude thereof. Thus, the voltage of the playback element 22 is changed. As a result, the control portion 8 can detect a change in electric field leaking from the disk D as a change in voltage. Moreover, the control portion 8 can perform the playback of information recorded on the disk D by performing the playback of the signal from the change in voltage.

(Manufacturing Method of Recording and Playback Head)

Next, a method of manufacturing the recording and playback head 2 having the near-field light generating element 26 mentioned above will be described. FIGS. 10A to 13B are diagrams corresponding to FIG. 7A to 7C and process diagrams for describing a method of manufacturing the near-field light generating element. In addition, FIGS. 10A, 11A, 12A, and 13A correspond to FIG. 7C, and FIGS. 10B, 11B, 12B, and 13B correspond to FIG. 7A. Furthermore, in the description as below, among the manufacturing processes of the recording and playback head 2, mainly, a manufacturing process of the near-field light generating element will be specifically described.

In the present embodiment, the recording and playback head 2 is manufactured by sequentially forming the recording element 21, the near-field light generating element 26, and the playback element 22 on the substrate 120 (for example, AlTiC (altic) or the like) becoming the slider 20, and then dicing them.

Figure 10A:
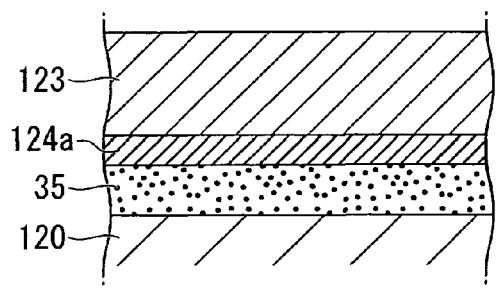
FIGS. 10A and 10B are process diagrams for describing a method of manufacturing a near-field light generating element corresponding to FIGS. 7A to 7C.
Figure 10B:
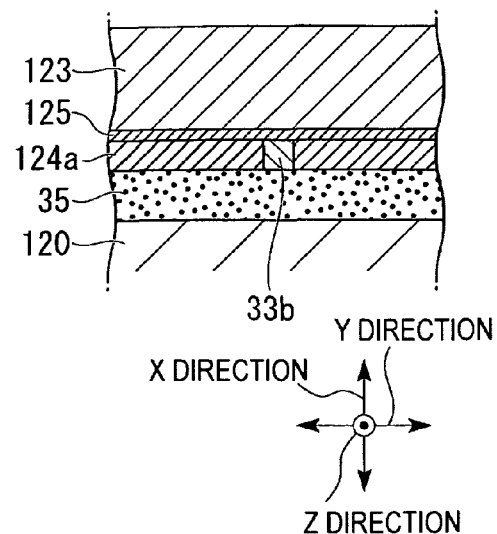

Firstly, as shown in FIGS. 10A and 10B, the recording element 21 (see FIG. 6) is formed on the substrate 120 and is molded by the insulator 35. After that, the base materials of the near-field light generating element 26 and the metal film 25 are formed on the insulator 35 (a first cladding forming process, and a core forming process). Specifically, the base materials (a first cladding base material 124a, a metal film base material 125, and a core base material 123) are formed on the substrate 120 (the insulator 35) in the order of the first cladding 24a, the metal film 25 (for example, about 20 nm), and the core 23 (in the region of some μm). In addition, after forming the respective base materials 124a, 125, and 123, the respective surfaces are polished by CMP (Chemical Mechanical Polishing) to form flat surfaces.

Additionally, it is desirable that the metal film base material 125 be patterned in advance so that only a predetermined region remains after being formed on the entire surface on the first cladding base material 124a. In the present embodiment, at least in the Z direction, the metal film base material 125 is patterned so as to remain (so as to remove the metal film base material 125 of a region equivalent to the light flux focusing portion 23a (see FIG. 6)) in a region equivalent to the near-field light creating portion 23b (see FIG. 6) in the core base material 123. In this case, as shown in FIG. 10B, in the region equivalent to the near-field light creating portion 23b, the metal film base material 125 is interposed between the core base material 123 and the first cladding base material 124a, and as shown in FIG. 10A, in other regions, the core base material 123 comes into close contact with the first cladding base material 124a.

Figure 11A:
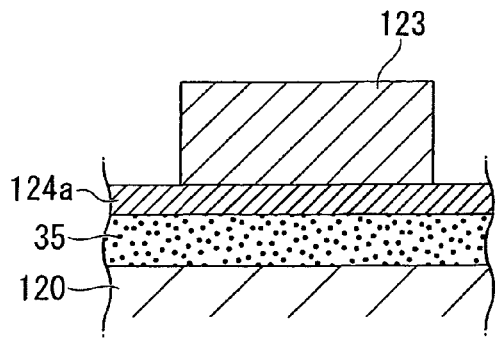
FIGS. 11A and 11B are process diagrams for describing a method of manufacturing a near-field light generating element corresponding to FIGS. 7A to 7C.
Figure 11B:
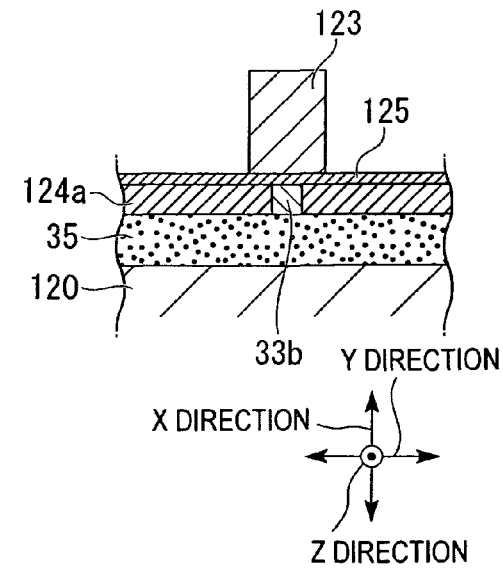

Next, as shown in FIGS. 11A and 11B, a mask pattern (not shown) is formed, in which a region where the core base material 123 needs to be removed is opened, on the core base material 123 by the use of a photolithography technique, and a reactive ion etching (RIE) is performed via the mask pattern (a first patterning process). As a result, the core base material 123 of the region having the opened mask pattern is vertically etched, whereby the core base material 123 of a rectangular shape when viewed from the Z direction is formed. Furthermore, the core base material 123 is formed in a trapezoidal shape that is tapered from the upper end side to the lower end side when viewed from the X direction.

Figure 12A:
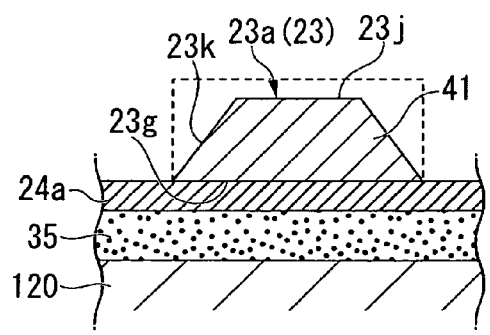
FIGS. 12A and 12B are process diagrams for describing a method of manufacturing a near-field light generating element corresponding to FIGS. 7A to 7C.
Figure 12B:
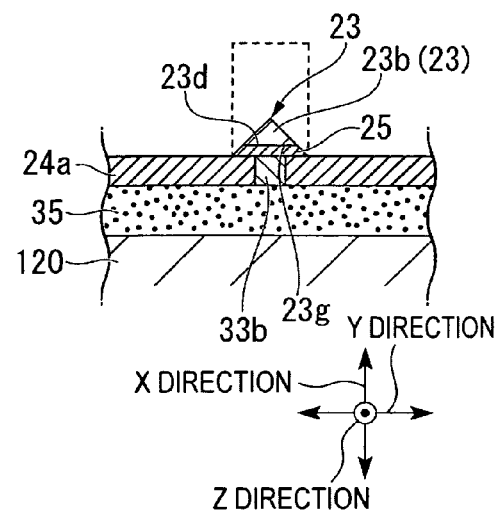

Next, as shown in FIGS. 12A and 12B, the core base material 123 and the metal film base material 125 are subjected to the sputter etching in plasma such as argon (Ar) (a second patterning process). In the second patterning process, when performing the sputter etching of the core base material 123 having a cross section of a rectangular shape, each corner of the core base material 123 is selectively etched, whereby a slope surface is formed. Moreover, when further continuing the etching in this state, the slope surface is etched while maintaining a certain angle to the bottom surface (equivalent to the side surface 23g in FIGS. 7A to 7C).

After that, when further continuing the etching, the core base material 123 is reduced in width (a width in the Y direction) and height (a height in the X direction) while maintaining the similar figure.

In addition, when further continuing the etching, the core 23 is etched while maintaining the similar figure, and the metal film base material 125 is etched. As a result, the metal film 25 having the same width as the side surface 23g of the core 23 is formed.

In this manner, by performing the sputter etching of the core base material 123 formed in the rectangular shape in the first patterning process, it is possible to form the core 23 at any arbitrary width or height when viewed from the Z direction. At this time, as shown in FIG. 12A, in the core base material 123, by allowing the top surface (the side surface 23j) to remain in the region equivalent to the upper end portion of the light flux focusing portion 23a, it is possible to form the trapezoidal portion 41 in which a cross-sectional shape is formed in a trapezoidal shape when viewing the upper end side of the core 23 from the Z direction.

Figure 13A:
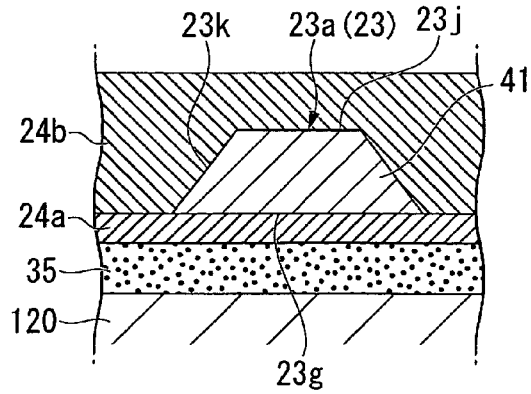
FIGS. 13A and 13B are process diagrams for describing a method of manufacturing a near-field light generating element corresponding to FIGS. 7A to 7C.
Figure 13B:
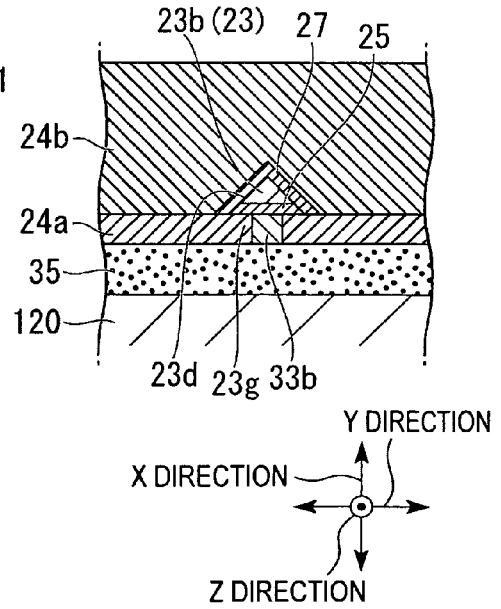

Next, as shown in FIGS. 13A and 13B, a light shielding film 27 is formed so as to cover the core 23 (a light shielding film forming process). Specifically, in a region corresponding to the near-field light creating portion 23b in the side surface 23d of the core 23, a dicing is performed so that the light shielding film 27 remains.

Moreover, a second cladding 24b is formed so as to cover the core 23 and the light shielding film 27 (a second cladding forming process). After that, the surface of the second cladding 24b is polished by the CMP or the like and is formed to a flat surface. Moreover, the playback element 22 is formed on the second cladding 24b. As a result, the recording element 21, the near-field light generating element 26, and the playback element 22 are formed on the substrate 120.

Next, the substrate 120 is diced into strips, thereby forming a bar (not shown) of the state in which a plurality of sliders 20 is aligned along one direction (the Y direction). After that, the side surface (the cut-off surface) of the diced bar is polished (a polishing process).

After that, the bar is cut so as to become sizes for each slider 20 (a slider process).

Finally, the laser light source 29 is mounted on the upper surface of the slider 20. Specifically, the semiconductor laser chip 44 is placed so as to face the upper end surface 41a of the trapezoidal portion 41 of the core 23 in the state in which the emitting side end surface of the laser light L faces downward.

In this manner, the recording and playback head 2 having the near-field light generating element 26 mentioned above is completed.

In this manner, in the present embodiment, a configuration was adopted in which the lengths of the upper end surface 41a of the core 23 in the longitudinal direction and the transverse direction are formed so as to match the lengths of the laser light L entered to the core 23 in the long axis direction and the short axis direction.

According to the configuration, for example, even when the laser light L having the spot shape of the elliptical shape such as a semiconductor laser is introduced, the laser light L emitted from the laser light source 29 can be introduced without omission. Furthermore, unlike a case where only the core shape (for example, a triangular shape or the like) of the related art is increased, it is possible to make the lengths in the upper end surface 41a of the core 23 in the longitudinal direction and the transverse direction as small as possible.

As a consequence, the sufficient amount of light can be ensured after promoting the reduction in size of the core 23, whereby it is possible to improve the generation efficiency of the near-field light R.

Furthermore, by directly mounting the laser light source 29 on the slider 20, the laser light L emitted from the laser light source 29 can directly be introduced to the core 23. As a result, for example, unlike a case where the laser light source is provided outside the recording and playback head, since there is no need to use an optical waveguide or the like for guiding the laser light L to the core 23, the loss of the laser light in the optical waveguide or the like is not considered. Thus, it is possible to introduce a sufficient amount of light into the core 23. Furthermore, it is possible to reduce the cost and the number of the manufacturing process by the provision of the optical waveguide.

Moreover, since the information recording and playback apparatus 1 of the present invention includes the recording and playback head 2, it is possible to suppress the influence of the thermal fluctuation phenomenon or the like, thereby performing the stable recording. Thus, the recording and playback of information can be performed accurately and at a high density, whereby the high quality can be promoted.

Second Embodiment

Figure 14:
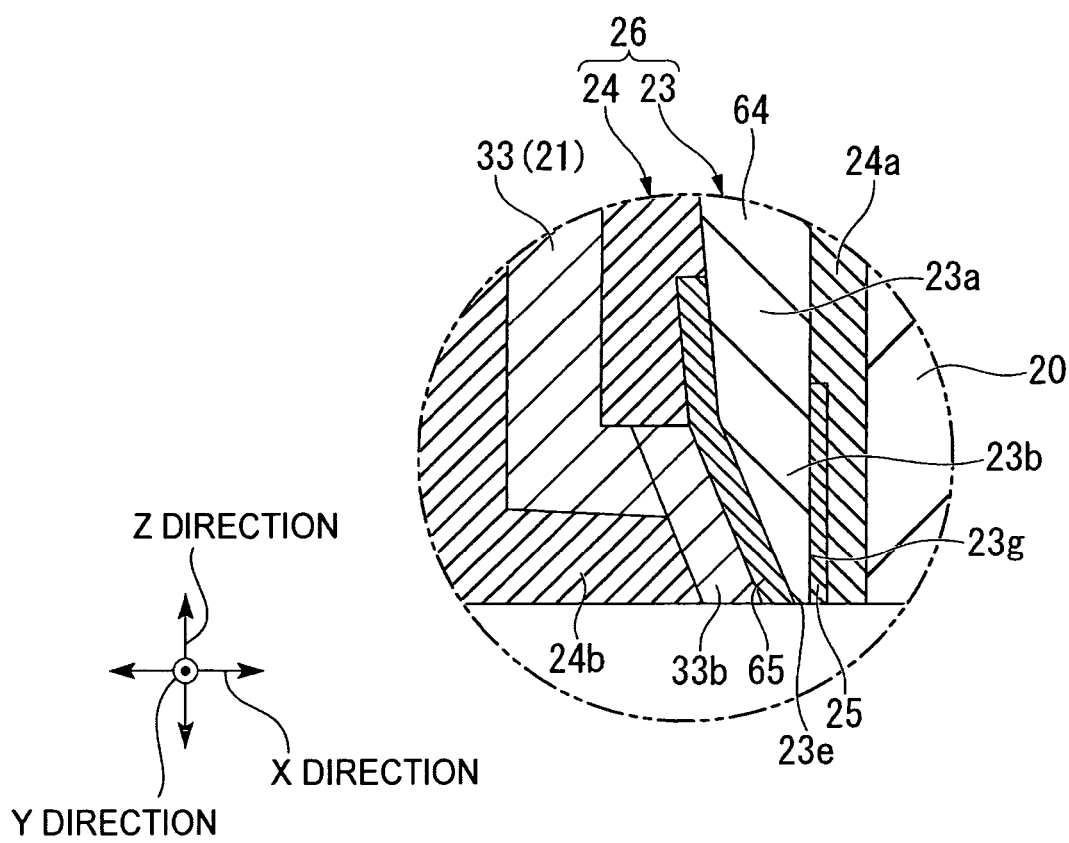
FIG. 14 is an enlarged cross-sectional view of an outflow end side (a front side) of a recording and playback head in a second embodiment.

Next, a second embodiment of the present invention will be described. FIG. 14 is an enlarged cross-sectional view of the front side of the recording and playback head in a second embodiment. In addition, in the description as below, the same configurations as the first embodiment mentioned above are denoted by the same reference numerals, and the descriptions thereof will be omitted. The present embodiment is different from the first embodiment mentioned above in that the lower end side of the core 23 has a two-layer structure.

As shown in FIG. 14, in the recording and playback head 2 of the present embodiment, the near-field light generating element 26, the recording element 21, and the playback element 22 are sequentially placed on the front end surface of the slider 20 along the X direction.

The lower end side of the core 23 of the near-field light generating element 26 includes a first core 64 of a triangular shape when viewed from the Z direction, and a second core 65 formed so as to cover the first core 64. In this case, the first core 64 is formed over the entire region of the front end surface of the slider 20 in the Z direction, and constitutes the whole (from the light flux focusing portion 23a to the near-field light generating portion 23b) of the core 23. Meanwhile, the second core 65 is formed so as to cover the lower end side of the first core 64 in the Z direction, and constitutes the near-field light creating portion 23b from the lower end side of the light flux focusing portion 23a. In addition, the forming region of the second core 65 may be formed so as to cover the whole first core 64 without being limited to the range mentioned above.

Furthermore, the recording element 21 is molded in the second cladding 24b, and the tip portion 33b of the main magnetic pole 33 is placed so as to cover the side surface 23d (see FIG. 7A) of the core 23. That is, the tip portion 33b of the main magnetic pole 33 of the present embodiment also serves as the light shielding film 27 (see FIGS. 7A to 7C) mentioned above.

According to the configuration, on the side surface of the slider 20, the near-field light generating element 26, the recording element 21, and the playback element 22 are placed along the rotation direction of the disk D. In this case, the disk D is firstly heated by the near-field light R generated from the near-field light generating element 26, and then passes through the lower part of the recording element 21 in the state in which the holding force is reliably lowered. Thus, it is possible to smoothly and accurately perform the recording onto the disk D.

Particularly, in the present embodiment, by forming the second core 65 so as to cover the first core 64, the width of the metal film 25 formed to match the first core 64 is formed to be narrower than the width of the side surface 23g of the whole core 23 (the first core 64 and the second core 65). For this reason, it is possible to promote a reduction in spot size of the near-field light R after suppressing a decline in propagating efficiency of the laser light L propagated in the core 23. As a result, since the spot size of the near-field light R can be reduced after ensuring the amount of light, the disk D can be further locally heated.

Third Embodiment

Next, a third embodiment of the present invention will be described. FIG. 15 is an enlarged cross-sectional view of the front side of the recording and playback head in a third embodiment, and FIG. 16 is a diagram taken of an arrow E of FIG. 15.

Figure 16:
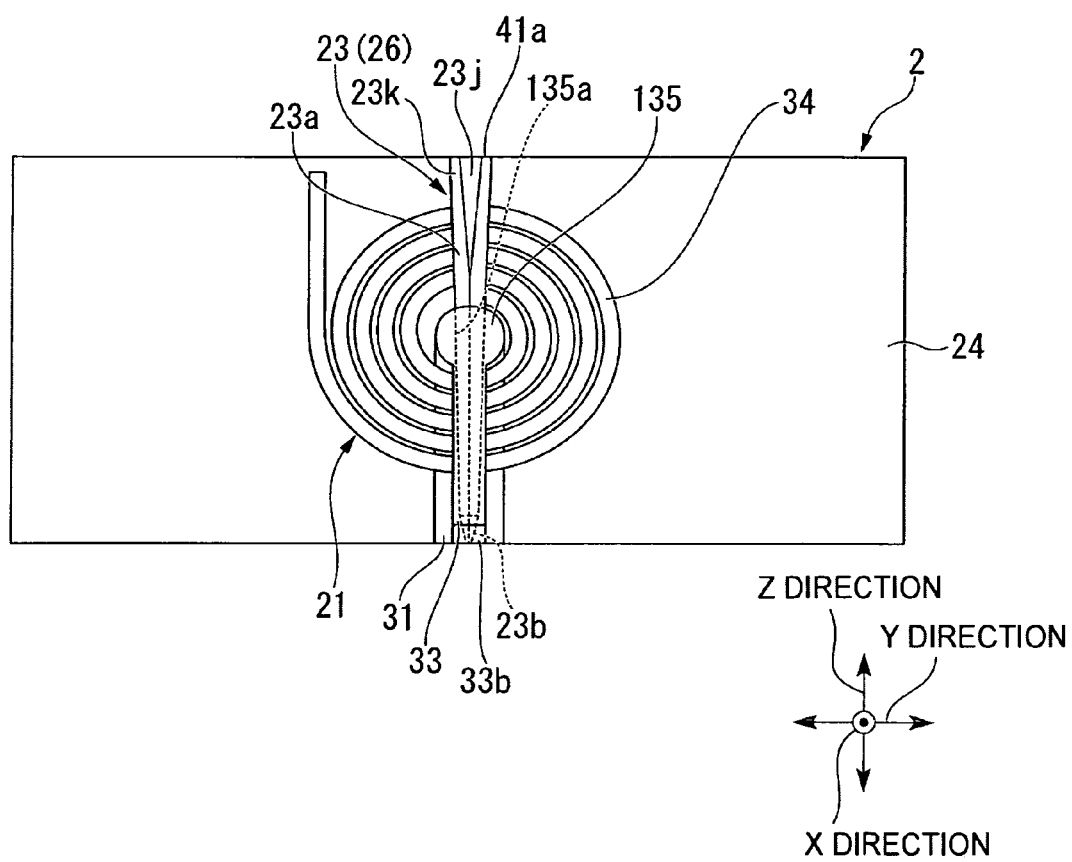
FIG. 16 is a view taken from an arrow E of FIG. 15.

As shown in FIGS. 15 and 16, the recording and playback head 2 of the present embodiment is configured so that the near-field light generating element 26 is placed between the coil 34 in the recording element 21 and the main magnetic pole 33. The recording element 21 in the present embodiment includes a return pole 31 and a coil 34 molded in the first cladding 24a, a main magnetic pole 33 molded in the second cladding 24b, and a yoke 135 disposed between the return pole 31 and the main magnetic pole 33.

The return pole 31 is placed on the playback element 22, and is connected to one end side of the yoke 135 extended along the X direction. The coil 34 is formed around the yoke 135 about the yoke 135 in a spiral shape. Furthermore, the yoke 135 is formed with a through hole 135a penetrating in the Z direction, and the core 23 is placed so as to be penetrated in the through hole 135a. Moreover, the main magnetic pole 33 is connected to the lower end (the opposite side of the return pole 31 with the core 23 interposed therebetween) of the yoke 135.

As mentioned above, during rotation of the disk D, when the recording and playback head 2 receives the force floating by the convex portion 20b, the recording and playback head 2 floats to a position separated from the upper portion of the disk D by a predetermine distance H (see FIG. 2). At this time, the posture of the slider 20 upon floating will be specifically described. The slider 20 is not horizontal to the disk surface D1 but is slightly inclined. Specifically, in the state in which the outflow end side of the slider 20 is closest to the disk D, the slider 20 is inclined so that an angle between the disk surface D1 and the ABS 20c of the slider 20 maintains a small angle.

Thus, according to the present embodiment, since the near-field light generating element 26 and the main magnetic pole 33 can be placed at the front end-most side in the slider 20, it is possible to generate the near-field light R by the near-field light generating element 26 and the magnetic field by the main magnetic pole 33 in the state of being closest to the disk D. As a result, the recording onto the disk D can be smoothly and accurately performed.

Fourth Embodiment

Next, a fourth embodiment of the present invention will be described. FIG. 17 is an enlarged cross-sectional view of the front side of the recording and playback head in a fourth embodiment. In the respective embodiments mentioned above, a configuration was described in which the laser light L is emitted downward from the semiconductor laser chip 44, but in the present embodiment, a configuration will be described in which the laser light L is emitted forward.

As shown in FIG. 17, a laser light source 129 of the present embodiment includes a semiconductor laser chip 144 mounted on the upper surface of the slider 20. The semiconductor laser chip 144 is placed in the state the emitting side end surface of the laser light L faces forward. In addition, the semiconductor laser chip 144 of the present embodiment emits the laser light L having the spot shape of the elliptical shape in which the Y direction is the long axis direction and the Z direction is the short axis direction.

Furthermore, at the emitting end surface side of the semiconductor laser chip 44, a micro mirror 150 is provided. For this reason, the laser light L emitted from the semiconductor laser chip 44 is reflected by the micro mirror 150 by 90° and is introduced into the core 23. In this case, a length T1 (a length between the side surfaces 23g and 23h) of the transverse direction (the front and rear direction) of the upper end surface 41a is formed to be equal to or greater than the length of the short axis direction of the spot shape, and a width T2 of the longitudinal direction in the middle portion of the front and back direction is formed to be equal to or greater than length of the long axis direction of the spot shape (see FIG. 7C).

In this manner, by causing the emission direction of the laser light L emitted from the semiconductor laser chip 44 to face forward, compared to a case where the emission direction is placed so as to face downward as in the related art, the width of the up and down direction (the Z direction) of the recording and playback head 2 can be reduced.

In addition, the technical scope of the present invention includes various modifications to the embodiments mentioned above in the range not departing from the gist of the present invention without being limited to the respective embodiments mentioned above. That is, the configurations or the like described in the embodiments mentioned above are merely an example and can be suitably changed.

For example, in the embodiments mentioned above, an information recording and playback apparatus of an air floating type was described as an example in which the recording and playback head floats, but the disk may be in contact with the recording and playback head if the recording and playback head is placed opposite to the disk surface, without being limited to the case. That is, the recording and playback head of the present invention may be a recording and playback head of a contact slider type. Even in this case, the same effect can be exhibited.

Furthermore, the respective embodiments may suitably be combined with each other.

Furthermore, in the embodiments mentioned above, a case was described where the recording and playback head 2 of the present invention is adopted as a vertical magnetic recording type that gives the recording magnetic field perpendicular to the disk D. However, an in-plane recording type may be adopted which gives the recording magnetic field horizontal to the disk D, without being limited thereto.

Furthermore, in the embodiments mentioned above, by performing the vertical etching of the core base material 123 in the first patterning process and performing the slope etching which removes the corner of the core base material 123 in the second pattering process, the core 23 of the present embodiment was formed. However, the core 23 may be formed by one etching on the core base material 123 formed on the substrate 120 without being limited thereto.

In addition, the light shielding film 27 may be formed between the metal film 25 and the first cladding 24a. That is, the light shielding film 27 may be formed over the whole circumference of the core 23. In this case, by reflecting the laser light L penetrating the metal film 25 and returning the same into the core 23 again, without causing plasmon resonance in the metal film 25, the laser light L can be incident to the metal film 25 again. As a result, the generation efficiency of the near-field light R can be further improved.

Furthermore, the shape of the upper end surface 41a of the core 23 (the trapezoidal portion 41) of the present embodiment can be suitably changed according to the spot diameter of the laser light L. In addition, the shape of the upper end surface 41a can be suitably changed in design, for example, a polygonal shape such as a rectangular shape, a pentagonal shape, a hexagonal shape, or a shape having a curved portion such as circular shape, an elliptical shape, and a fan shape, or the like, without being limited to the trapezoidal shape.

Additionally, a configuration may be adopted in which the laser light L emitted from the laser light source 29 is guided to the near-field light generating element 26 via the optical waveguide, without directly mounting the laser light source 29 at the upper surface side of the slider 20.

What is claimed is:

1. A recording head comprising:
    a slider that is disposed opposite to a surface of a magnetic recording medium rotating in a certain direction;
    a light flux transmission element that is held in the slider, and transmits the light flux emitted from a light source while focusing the light flux toward the surface of the magnetic recording medium; and
    a recording element that gives the magnetic recording medium a recording magnetic field,
    wherein the light flux transmission element has a core that guides the light flux in a direction of the magnetic recording medium while reflecting the light flux, and claddings that encapsulate the core in an inner portion, and
    lengths of a longitudinal direction and a transverse direction of an incident side end surface of the light flux in the core are formed so as to match the lengths of a long axis direction and a short axis direction of the light flux that is entered to the core.

2. The recording head according to claim 1, wherein the light source is directly mounted on the slider.

3. The recording head according to claim 1, wherein a shape of the incident side end surface of the core is formed in a polygonal shape.

4. The recording head according to claim 3, wherein the shape of the incident side end surface of the core is formed in a trapezoidal shape.

5. The recording head according to claim 1, wherein the shape of the incident side end surface of the core is formed in the trapezoidal shape, and a shape of an emission side end surface is formed in a triangular shape.

6. The recording head according to claim 1, wherein the incident side end surface of the core has a curved portion.

7. A method of manufacturing the recording head according to claim 1, comprising:
    a first cladding forming process of forming a first cladding among the claddings on the slider;
    a core forming process of forming a base material of the core on the first cladding;
    a patterning process of patterning the base material of the core; and
    a second cladding forming process of forming a second cladding among the claddings so as to interpose the core between the second cladding and the first cladding,
    wherein, in the pattering process, the lengths of the longitudinal direction and the transverse direction of the incident side end surface of the light flux in the core are patterned so as to match the lengths of a long axis direction and a short axis direction of the light flux that is entered to the core.

8. An information recording and playback apparatus comprising:
    the recording head according to claim 1;
    a suspension that can be moved in a direction parallel to the surface of the magnetic recording medium and supports the recording head at a tip side in the state of being freely rotatable around two axes which are parallel to the surface of the magnetic recording medium and perpendicular to each other;
    an actuator that supports a proximal end side of the suspension, and moves the suspension toward a direction parallel to the surface of the magnetic recording medium;
    a rotation driving portion that rotates the magnetic recording medium in the certain direction; and
    a control portion that controls the operation of the recording element and the light source.

* * * * *